US010326516B2

(12) United States Patent
Zhao

(10) Patent No.: US 10,326,516 B2
(45) Date of Patent: Jun. 18, 2019

(54) RELAY TERMINAL RESELECTION METHOD AND DEVICE

(71) Applicant: China Academy of Telecommunications Technology, Beijing (CN)

(72) Inventor: Yali Zhao, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 10 days.

(21) Appl. No.: 15/501,808

(22) PCT Filed: Aug. 10, 2015

(86) PCT No.: PCT/CN2015/086537
§ 371 (c)(1),
(2) Date: Feb. 3, 2017

(87) PCT Pub. No.: WO2016/026396
PCT Pub. Date: Feb. 25, 2016

(65) Prior Publication Data
US 2017/0244468 A1 Aug. 24, 2017

(30) Foreign Application Priority Data

Aug. 22, 2014 (CN) .......................... 2014 1 0419123

(51) Int. Cl.
H04W 4/00 (2018.01)
H04B 7/14 (2006.01)
(Continued)

(52) U.S. Cl.
CPC ............. H04B 7/14 (2013.01); H04W 36/06 (2013.01); H04W 36/24 (2013.01); H04W 48/16 (2013.01); H04W 84/18 (2013.01); H04W 88/04 (2013.01)

(58) Field of Classification Search
None
See application file for complete search history.

(56) References Cited

U.S. PATENT DOCUMENTS 8,879,980 B2 * 11/2014 Bienas .................. H04W 24/00
455/11.1
2010/0103845 A1 4/2010 Ulupinar et al.
(Continued)

FOREIGN PATENT DOCUMENTS

CN 101651478.3 A 2/2010
CN 102469410 A 5/2012
(Continued)

OTHER PUBLICATIONS

3GPP TR23.703 "3rd Generation Partnership Project; Technical Specification Group Services and System Aspects; Study on architecture enhancements to support Proximity-based services (ProSe)" 3GPP,Valbonne, France, Feb. 2014 (324 Pages)vol. 12.
(Continued)

Primary Examiner — Anh Vu H Ly
(74) Attorney, Agent, or Firm — Foley & Lardner LLP

(57) ABSTRACT

Disclosed are a relay terminal reselection method and device. A control node performs relay terminal reselection judgement for a source terminal according to a reselection triggering condition of a relay terminal, and if deciding to perform relay terminal reselection, the control node determines a candidate relay terminal list for the source terminal and determines a destination a destination relay terminal for the source terminal from the candidate relay terminal list according to auxiliary information, wherein the control node is the source terminal or a source relay terminal, such that when in the moving process of the source terminal, a target node and the source relay terminal, the source relay terminal is no longer suitable to be used as a relay terminal, the source (Continued)

terminal or the source relay terminal can reselect a relay terminal for the source terminal.

17 Claims, 7 Drawing Sheets

(51) Int. Cl.
*H04W 36/06* (2009.01)
*H04W 36/24* (2009.01)
*H04W 48/16* (2009.01)
*H04W 84/18* (2009.01)
*H04W 88/04* (2009.01)

(56) References Cited

U.S. PATENT DOCUMENTS

| | | | |
|---|---|---|---|
| 2012/0135677 A1 | 5/2012 | Hsu et al. | |
| 2013/0188552 A1 | 7/2013 | Kazmi et al. | |
| 2015/0045033 A1* | 2/2015 | Kim | H04B 7/15507 455/436 |
| 2015/0045044 A1* | 2/2015 | Liu | H04W 4/70 455/450 |
| 2015/0146620 A1* | 5/2015 | Phan | H04W 76/14 370/328 |
| 2015/0341794 A1* | 11/2015 | Vanderveen | G06Q 30/0261 705/14.58 |
| 2015/0382159 A1* | 12/2015 | Kim | H04W 4/08 370/312 |
| 2016/0135203 A1* | 5/2016 | Kim | H04W 48/20 370/315 |
| 2016/0150373 A1* | 5/2016 | Kim | H04B 7/026 455/456.3 |

FOREIGN PATENT DOCUMENTS

| | | |
|---|---|---|
| CN | 102769938.0 A | 11/2012 |
| CN | 103581877.6 A | 2/2014 |
| CN | 103634812 A | 3/2014 |
| CN | 103781016 A | 5/2014 |
| CN | 103796317 | 5/2014 |
| CN | 103891172 A | 6/2014 |
| EP | 2 018 074 A1 | 1/2009 |
| EP | 2 733 988 A2 | 5/2014 |
| EP | 2733988 A2 | 5/2014 |
| JP | 2005-223697 A | 8/2005 |
| JP | 2009-218922 A | 9/2009 |
| WO | WO-2012/102546 A2 | 8/2012 |
| WO | WO-2018/048078 A1 | 3/2018 |

OTHER PUBLICATIONS

S2-134143 "Solution on ProSe Relay Selection and Re-selection" SA WG2 Meeting #100, LG Electronics,3GPP, San Francisco, USA, Nov. 11-15, 2013, (6pages).

"3rd Generation Partnership Project;Technical Specification Group Services and System Aspects;Proximity-based services (ProSe) ; Stage 2 (Release 12)", 3GPP, 3GPP TS 23. 303 VI2. 1. 0,(Jun. 2014) (pp. 1-60).

"Considerations about ProSe UE-UE Relays", CATT, SA WG2 Meeting #104 S2-142594, Jul. 7-11, 2014, Dublin, Ireland (pp. 1-3).

* cited by examiner

RELAY TERMINAL RESELECTION METHOD AND DEVICE

This application is a US National Stage of International Application No. PCT/CN2015/086537, filed on Aug. 10, 2015, designating the United States, and claiming the benefit of Chinese Patent Application No. 201410419123.9, filed with the Chinese Patent Office on Aug. 22, 2014 and entitled "A method and device for reselecting a relay terminal", each of which is hereby incorporated by reference in its entirety.

FIELD

The present invention relates to the field of mobile communications, and particularly to a method and device for reselecting a relay terminal.

BACKGROUND

In a mobile communication system, Device-to-Device (D2D) communication refers to such a mode in which adjacent terminals can transmit data to each other over a direct link in a short-distance range, where neither the data are required to be forwarded by a central node (i.e., a base station), nor information is required to be transmitted between User Equipments (UEs) over a traditional cellular link. Communication in a D2D proximity service is typically conducted under the control by or with the aid of the network side, where an evolved Node B (eNB) may even allocate dynamically a resource for a UE communicating in the D2D proximity service. Mechanisms of the D2D proximity service include the Device to Device (D2D) discovery mechanism and the D2D communication mechanism. With the D2D discovery mechanism, a terminal discovers an adjacent terminal; and with the D2D communication mechanism, two UEs proximate to each other can have a link set up directly between the two UEs.

Further to the D2D discovery and D2D communication technologies, the UE can transmit data with the network or the other UE by selecting a relay UE. There are types of relays in the following two scenarios in the D2D system:

(1) A UE-to-network relay: an out of coverage source UE going to communicate with the network can select an adjacent in-coverage UE for the source UE to repeat data for the source UE, so that the out of coverage UE communicates with the network through the in-coverage UE, where the in-coverage UE is referred to a UE-to-network relay. As illustrated in FIG. 1, a UE2 which is not covered by the network but going to communicate with the network can select a UE1 as a relay node, so that uplink and downlink signals of the UE2 is forwarded by the UE1, where communication between the UE1 and the UE2 is embodied as D2D communication, and communication between the UE1 and the network is embodied as cellular communication.

(2) A UE-to-UE relay: if there is such a distance between a source UE and a destination UE that no D2D discovery or D2D communication can be made directly between them, then a third-party UE adjacent to both the source UE and the destination UE will be selected as a relay node responsible for repeating data, so that a D2D discovery or D2D communication is made between these two UEs, where the third-party UE is referred to a UE-to-UE relay. As illustrated in FIG. 2, the UE2 can have its information forwarded by the UE1 in order to communicate with a UE4 which is not located in a range of direct communication with the UE2, where data are transmitted between the UE1 and the UE2, and between the UE1 and the UE4 through D2D communication.

In the communication process, all of the source UE, the destination UE, and the relay UE are mobile, so such a problem will be faced by the source UE operating with either the UE-to-network relay or the UE-to-UE relay that the source UE needs to reselect the relay UE capable of providing the source UE and the destination UE with the data transmission service, but there has been absent so far a corresponding solution to this problem.

SUMMARY

Embodiments of the invention provide a method and device for reselecting a relay terminal so as to address the problem of how a source UE reselects a relay UE.

An embodiment of the invention provides a method for reselecting a relay terminal, the method including:

making, by a control node, a relay terminal reselection decision for a source terminal according to a relay terminal reselection trigger condition, wherein the control node is a source terminal or a source relay terminal;

determining, by the control node, a list of candidate relay terminals for the source terminal, if the control node decides to reselect a relay terminal; and determining, by the control node, a destination relay terminal for the source terminal from the list of candidate relay terminals according to obtained assistance information.

With this method, if the source relay terminal is not suitable for acting as a relay terminal any longer while the source terminal, the destination node, and the source relay terminal are moving, then the source terminal or the source relay terminal will reselect a destination relay terminal for the source terminal.

Furthermore the list of candidate relay terminals includes terminals adjacent to both the source terminal and a destination terminal, and capable of providing a relay service, so that the control node can select a UE-to-UE relay as the destination relay terminal for the source terminal from the list of candidate relay terminals.

Furthermore if the control node device is the source terminal, then the list of candidate relay terminals is determined by the source terminal, or if the control node is the source relay terminal, then the list of candidate relay terminals is determined by the source terminal, and fed back to the source relay terminal; and determining, by the source terminal, the list of candidate relay terminals includes:

receiving, by the source terminal, a discovery signal broadcasted by an adjacent terminal, and if the discovery signal carries identification information of the destination terminal, and information indicating that the adjacent terminal is capable of providing the source terminal with a relay service, then determining the adjacent terminal as a candidate relay terminal of the source terminal, and putting identification information of the adjacent terminal into the list of candidate relay terminals, wherein the adjacent terminal carries the identification information of the destination terminal in the discovery signal after discovering the destination terminal; or broadcasting, by the source terminal, a discovery signal carrying identification information of the source terminal and the destination terminal, and information indicating that the source terminal needs a relay service, and if the source terminal receives discovery signal response information of an adjacent terminal, which carries information indicating that the adjacent terminal is capable of providing the source terminal with a relay service, then determining the adjacent terminal as a candidate relay terminal of the source terminal, and putting identification information of the adjacent terminal into the list of candidate relay terminals, wherein the adjacent terminal returns the discover signal response information to the source terminal upon discovering the terminal corresponding to the identification information of the destination terminal.

With the implementation above, the source terminal or the source relay terminal reselecting a relay terminal in the UE-to-UE relay scenario determines the list of candidate relay terminals for the source terminal.

Furthermore the list of candidate relay terminals includes in-coverage terminals adjacent to the source terminal, and capable of providing a relay service, so that the control node can select a UE-to-network relay as the destination relay terminal for the source terminal from the list of candidate relay terminals.

Furthermore if the control node device is the source terminal, then the list of candidate relay terminals is determined by the source terminal, or if the control node is the source relay terminal, then the list of candidate relay terminals is determined by the source terminal, and fed back to the source relay terminal; and determining, by the source terminal, the list of candidate relay terminals includes:

receiving, by the source terminal, a discovery signal broadcasted by an adjacent terminal, and if the discovery signal carries information indicating that the adjacent terminal is capable of providing the source terminal with a relay service, then determining the adjacent terminal as a candidate relay terminal of the source terminal, and putting identification information of the adjacent terminal into the list of candidate relay terminals; or broadcasting, by the source terminal, a discovery signal carrying identification information of the source terminal, and information indicating that the source terminal needs a relay service, and if the source terminal receives discovery signal response information of an adjacent terminal, which carries information indicating that the adjacent terminal is capable of providing the source terminal with a relay service, then determining the adjacent terminal as a candidate relay terminal of the source terminal, and putting identification information of the adjacent terminal into the list of candidate relay terminals.

With the implementation above, the source terminal or the source relay terminal reselecting a relay terminal in the UE-to-network relay scenario determines the list of candidate relay terminals for the source terminal.

Furthermore the relay terminal reselection trigger condition includes at least one of the following conditions:

a first condition is that a channel quality or a signal received strength between the source terminal and the source relay terminal is below a preset threshold; or transmission still fails after the number of transmissions or retransmissions between the source terminal and the source relay terminal reaches a preset maximum number;

a second condition is that a channel quality or a signal received strength between the source relay terminal and a destination node is below a preset threshold; or transmission still fails after the number of transmissions or retransmissions between the source relay terminal and a destination node reaches a preset maximum number, wherein the destination node is a destination terminal or a destination network node; and a third condition is that the source relay terminal is not suitable for acting as a relay terminal of the source terminal any longer, according to a relay strategy of the source relay terminal.

With the implementation above, the control node reselecting a relay terminal in UE-to-UE relay scenario or the UE-to-network relay scenario reselects a relay terminal for the source terminal upon determining that at least one of the relay terminal reselection trigger conditions above is satisfied.

Furthermore if the control node device is the source terminal, then:

if the relay terminal reselection trigger condition includes the first condition, then the first condition is measured by the source terminal, or measured by the source relay terminal, and fed back to the source terminal;

if the relay terminal reselection trigger condition includes the second condition, then the second condition is measured by the source relay terminal, and fed back to the source terminal, or measured by the destination node, and fed back to the source terminal through the source relay terminal; and if the relay terminal reselection trigger condition includes the third condition, then the third condition is determined by the source relay terminal, and fed back to the source terminal.

With the implementation above, the source terminal reselecting a relay terminal in UE-to-UE relay scenario or the UE-to-network relay scenario obtains the relay terminal reselection trigger condition above.

Furthermore if the control node device is the source relay terminal, then:

if the relay terminal reselection trigger condition includes the first condition, then the first condition is measured by the source terminal, and fed back to the source relay terminal, or measured by the source relay terminal;

if the relay terminal reselection trigger condition includes the second condition, then the second condition is measured by the source relay terminal, or measured by the destination node, and fed back to the source relay terminal; and if the relay terminal reselection trigger condition includes the third condition, then the third condition is determined by the source relay terminal.

With the implementation above, the source relay terminal reselecting a relay terminal in UE-to-UE relay scenario or the UE-to-network relay scenario obtains the relay terminal reselection trigger condition above.

Furthermore the assistance information includes at least one of:

first assistance information which is channel qualities or signal received strengths between the source terminal and the candidate relay terminals;

second assistance information which is channel qualities or signal received strengths between the candidate relay terminals and a destination node, wherein the destination node is a destination terminal or a destination network node; and third assistance information which is relay strategies of the candidate relay terminals.

With the implementation above, the control node reselecting a relay terminal in UE-to-UE relay scenario or the UE-to-network relay scenario determines the destination relay terminal for the source terminal from the list of candidate relay terminals according to the obtained assistance information.

Furthermore if the control node device is the source terminal, then:

if the assistance information includes the first assistance information, then the first assistance information is measured by the source terminal, or measured by the candidate relay terminals, and fed back to the source terminal;

if the assistance information includes the second assistance information, then the second assistance information is measured by the candidate relay terminal or the destination node, and fed back to the source terminal; and if the assistance information includes the third assistance information, then the third assistance information is determined by the candidate relay terminals, and fed back to the source terminal.

With the implementation above, the source terminal reselecting a relay terminal in UE-to-UE relay scenario or the UE-to-network relay scenario obtains the assistance information above.

Furthermore if the control node device is the source relay terminal, then:

if the assistance information includes the first assistance information, then the first assistance information is measured by the source terminal, and fed back to the source relay terminal, or measured by the candidate relay terminals, and fed back to the source relay terminal through the source terminal;

if the assistance information includes the second assistance information, then the second assistance information is measured by the destination node, and fed back to the source relay terminal, or measured by the candidate relay terminals, and fed back to the source relay terminal through the destination node; and if the assistance information includes the third assistance information, then the third assistance information is determined by the candidate relay terminals, and fed back to the source relay terminal through the source terminal or the destination node.

With the implementation above, the source relay terminal reselecting a relay terminal in UE-to-UE relay scenario or the UE-to-network relay scenario obtains the assistance information above.

Further if the control node is the source terminal, after the control node determines the destination relay terminal for the source terminal from the list of candidate relay terminals according to the assistance information, the method further includes:

sending, by the source terminal, a connection release command to the source relay terminal, and setting up a connection with the destination relay terminal, wherein the connection release command instructs the source relay terminal to release the connection with the source terminal, and instructs the source relay terminal to instruct the destination node to release the connection with the source relay terminal, wherein the destination node is a destination terminal or a destination network node.

With the implementation above, the if the control node is the source terminal, then after the source terminal determines the destination relay terminal, the source terminal will set up the connection with the destination relay terminal, and the source terminal will instruct the source relay terminal to release the connection with the source terminal, and instruct the destination node through the source relay terminal to release the connection with the source relay terminal, so that the source terminal and the destination node subsequently set up the connections respectively with the destination relay terminal.

Or

If the control node is the source relay terminal, after the control node determines the destination relay terminal for the source terminal from the list of candidate relay terminals according to the assistance information, the method further includes:

sending, by the source relay terminal, a first connection release command to the source terminal, and a second connection release command to a destination node, wherein the first connection release command instructs the source terminal to release the connection with the source relay terminal, and the second connection release command instructs the destination node to release the connection with the source relay terminal; and the destination node is a destination terminal or a destination network node.

With the implementation above, the if the control node is the source relay terminal, then after the source relay terminal determines the destination relay terminal, the source relay terminal will instruct the source terminal and the destination node to release the connections respectively with the source relay terminal, so that the source terminal and the destination node subsequently set up the connections respectively with the destination relay terminal.

Furthermore the connection release command carries information about the destination relay terminal, and after the destination node receives the instruction sent by the source relay terminal, the method further includes: setting up a connection between the destination node and the destination relay terminal.

With the implementation above, if the control node is the source terminal, then the control node will instruct the destination node through the source relay terminal to set up the connection with the destination relay terminal.

Or

Both the first connection release command and the second connection release command carry information about the destination relay terminal, and after the source terminal and the destination node receive the first connection release command or the second connection release command, the method further includes: setting up a connection between the destination node and the destination relay terminal.

With the implementation above, if the control node is the source relay terminal, then the source relay terminal will instruct the destination node to set up the connection with the destination relay terminal.

Furthermore if the control node is the source terminal, then after the control node decides to reselect a relay terminal, the method further includes:

sending, by the source terminal, an instruction message to a destination node through the source relay terminal to instruct the destination node to stop data from being transmitted to the source terminal, wherein the destination node is a destination terminal or a destination network node; or if the control node is the source relay terminal, then after the control node decides to reselect a relay terminal, the method further includes:

sending, by the source relay terminal, a first instruction message to the source terminal, and a second instruction message to a destination node, wherein the first instruction message instructs the source terminal to stop data from being transmitted to the destination node, and the second instruction message instructs the destination node to stop data from being transmitted to the source terminal; and the destination node is a destination terminal or a destination network node.

With the implementation above, the control node instructs the source terminal or the destination node to stop data from being transmitted, upon deciding to reselect a relay terminal, so that a loss of data between the source terminal and the destination node while a relay terminal is being reselected can be avoided as many as possible.

An embodiment of the invention further provides a control node device, which is a source terminal or a source relay terminal, the control node device including:

a deciding module configured to make a relay terminal reselection decision for a source terminal according to a relay terminal reselection trigger condition;

a first determining module configured, if it is decided to reselect a relay terminal, to determine a list of candidate relay terminals for the source terminal; and a second determining module configured to determine a destination relay terminal for the source terminal from the list of candidate relay terminals according to obtained assistance information.

With this control node device, if the source relay terminal is not suitable for acting as a relay terminal any longer while the source terminal, the destination node, and the source relay terminal are moving, then the source terminal or the source relay terminal will reselect a destination relay terminal for the source terminal.

Furthermore the list of candidate relay terminals includes terminals adjacent to both the source terminal and a destination terminal, and capable of providing a relay service, so that the control node device can select a UE-to-UE relay as the destination relay terminal for the source terminal from the list of candidate relay terminals.

Furthermore the first determining module is configured:

if the control node device is the source terminal, to receive a discovery signal broadcasted by an adjacent terminal, and if the discovery signal carries identification information of the destination terminal, and information indicating that the adjacent terminal is capable of providing the source terminal with a relay service, to determine the adjacent terminal as a candidate relay terminal of the source terminal, and to put identification information of the adjacent terminal into the list of candidate relay terminals, wherein the adjacent terminal carries the identification information of the destination terminal in the discovery signal after discovering the destination terminal; or if the control node device is the source terminal, to broadcast a discovery signal carrying identification information of the source terminal and the destination terminal, and information indicating that the source terminal needs a relay service, and if the source terminal receives discovery signal response information of an adjacent terminal, which carries information indicating that the adjacent terminal is capable of providing the source terminal with a relay service, to determine the adjacent terminal as a candidate relay terminal of the source terminal, and to put identification information of the adjacent terminal into the list of candidate relay terminals, wherein the adjacent terminal returns the discover signal response information to the source terminal upon discovering the terminal corresponding to the identification information of the destination terminal; or if the control node device is the source relay terminal, to receive the list of candidate relay terminals determined and fed back by the source terminal.

With the implementation above, the source terminal or the source relay terminal reselecting a relay terminal in the UE-to-UE relay scenario determines the list of candidate relay terminals for the source terminal.

Furthermore the list of candidate relay terminals includes in-coverage terminals adjacent to the source terminal, and capable of providing a relay service, so that the control node device can select a UE-to-network relay as the destination relay terminal for the source terminal from the list of candidate relay terminals.

Furthermore the first determining module is configured:

if the control node device is the source terminal, to receive a discovery signal broadcasted by an adjacent terminal, and if the discovery signal carries information indicating that the adjacent terminal is capable of providing the source terminal with a relay service, to determine the adjacent terminal as a candidate relay terminal of the source terminal, and to put identification information of the adjacent terminal into the list of candidate relay terminals; or if the control node device is the source terminal, to broadcast a discovery signal carrying identification information of the source terminal, and information indicating that the source terminal needs a relay service, and if the source terminal receives discovery signal response information of an adjacent terminal, which carries information indicating that the adjacent terminal is capable of providing the source terminal with a relay service, to determine the adjacent terminal as a candidate relay terminal of the source terminal, and to put identification information of the adjacent terminal into the list of candidate relay terminals; or if the control node device is the source relay terminal, to receive the list of candidate relay terminals determined and fed back by the source terminal.

With the implementation above, the source terminal or the source relay terminal reselecting a relay terminal in the UE-to-network relay scenario determines the list of candidate relay terminals for the source terminal.

Furthermore the relay terminal reselection trigger condition includes at least one of the following conditions:

a first condition is that a channel quality or a signal received strength between the source terminal and the source relay terminal is below a preset threshold; or transmission still fails after the number of transmissions or retransmissions between the source terminal and the source relay terminal reaches a preset maximum number;

a second condition is that a channel quality or a signal received strength between the source relay terminal and a destination node is below a preset threshold; or transmission still fails after the number of transmissions or retransmissions between the source relay terminal and a destination node reaches a preset maximum number, wherein the destination node is a destination terminal or a destination network node; and a third condition is that the source relay terminal is not suitable for acting as a relay terminal of the source terminal any longer, according to a relay strategy of the source relay terminal.

With the implementation above, the control node device reselecting a relay terminal in UE-to-UE relay scenario or the UE-to-network relay scenario reselects a relay terminal for the source terminal upon determining that at least one of the relay terminal reselection trigger conditions above is satisfied.

Furthermore if the control node device is the source terminal, then:

if the relay terminal reselection trigger condition includes the first condition, then the first condition is measured by the source terminal, or measured by the source relay terminal, and fed back to the source terminal;

if the relay terminal reselection trigger condition includes the second condition, then the second condition is measured by the source relay terminal, and fed back to the source terminal, or measured by the destination node, and fed back to the source terminal through the source relay terminal; and if the relay terminal reselection trigger condition includes the third condition, then the third condition is determined by the source relay terminal, and fed back to the source terminal.

With the implementation above, the source terminal reselecting a relay terminal in UE-to-UE relay scenario or the UE-to-network relay scenario obtains the relay terminal reselection trigger condition above.

Furthermore if the control node device is the source relay terminal, then:

if the relay terminal reselection trigger condition includes the first condition, then the first condition is measured by the source terminal, and fed back to the source relay terminal, or measured by the source relay terminal;

if the relay terminal reselection trigger condition includes the second condition, then the second condition is measured by the source relay terminal, or measured by the destination node, and fed back to the source relay terminal; and if the relay terminal reselection trigger condition includes the third condition, then the third condition is determined by the source relay terminal.

With the implementation above, the source relay terminal reselecting a relay terminal in UE-to-UE relay scenario or the UE-to-network relay scenario obtains the relay terminal reselection trigger condition above.

Furthermore the assistance information includes at least one of:

first assistance information which is channel qualities or signal received strengths between the source terminal and the candidate relay terminals;

second assistance information which is channel qualities or signal received strengths between the candidate relay terminals and a destination node, wherein the destination node is a destination terminal or a destination network node; and third assistance information which is relay strategies of the candidate relay terminals.

With the implementation above, the control node reselecting a relay terminal in UE-to-UE relay scenario or the UE-to-network relay scenario determines the destination relay terminal for the source terminal from the list of candidate relay terminals according to the obtained assistance information.

Furthermore if the control node device is the source terminal, then:

if the assistance information includes the first assistance information, then the first assistance information is measured by the source terminal, or measured by the candidate relay terminals, and fed back to the source terminal;

if the assistance information includes the second assistance information, then the second assistance information is measured by the candidate relay terminal or the destination node, and fed back to the source terminal; and if the assistance information includes the third assistance information, then the third assistance information is determined by the candidate relay terminals, and fed back to the source terminal.

With the implementation above, the source terminal reselecting a relay terminal in UE-to-UE relay scenario or the UE-to-network relay scenario obtains the assistance information above.

Furthermore if the control node device is the source relay terminal, then:

if the assistance information includes the first assistance information, then the first assistance information is measured by the source terminal, and fed back to the source relay terminal, or measured by the candidate relay terminals, and fed back to the source relay terminal through the source terminal;

if the assistance information includes the second assistance information, then the second assistance information is measured by the destination node, and fed back to the source relay terminal, or measured by the candidate relay terminals, and fed back to the source relay terminal through the destination node; and if the assistance information includes the third assistance information, then the third assistance information is determined by the candidate relay terminals, and fed back to the source relay terminal through the source terminal or the destination node.

With the implementation above, the source relay terminal reselecting a relay terminal in UE-to-UE relay scenario or the UE-to-network relay scenario obtains the assistance information above.

Furthermore the control node device further includes a sending module, wherein:

the sending module is configured, if the control node device is the source terminal, to send a connection release command to the source relay terminal, and to set up a connection with the destination relay terminal, wherein the connection release command is sent, after the second determining module determines the destination relay terminal for the source terminal, to instruct the source relay terminal to release the connection with the source terminal, and to instruct the source relay terminal to instruct the destination node to release the connection with the source relay terminal, wherein the destination node is a destination terminal or a destination network node.

With the implementation above, the if the control node device is the source terminal, then after the source terminal determines the destination relay terminal, the source terminal will set up the connection with the destination relay terminal, and the source terminal will instruct the source relay terminal to release the connection with the source terminal, and instruct the destination node through the source relay terminal to release the connection with the source relay terminal, so that the source terminal and the destination node subsequently set up the connections respectively with the destination relay terminal.

Or

The sending module is configured, if the control node device is the source relay terminal, to send a first connection release command to the source terminal, and a second connection release command to a destination node, wherein the first connection release command and the second connection release command are sent after the second determining module determines the destination relay terminal for the source terminal; the first connection release command instructs the source terminal to release the connection with the source relay terminal, and the second connection release command instructs the destination node to release the connection with the source relay terminal; and the destination node is a destination terminal or a destination network node.

With the implementation above, the if the control node device is the source relay terminal, then after the source relay terminal determines the destination relay terminal, the source relay terminal will instruct the source terminal and the destination node to release the connections respectively with the source relay terminal, so that the source terminal and the destination node subsequently set up the connections respectively with the destination relay terminal.

Furthermore the control node device further includes an instructing module, wherein:

the instructing module is configured, if the control node is the source terminal, to send an instruction message to a destination node, wherein the instruction message is sent, after the deciding module decides to reselect a relay terminal, to instruct the destination node to stop data from being transmitted to the source terminal, and the destination node is a destination terminal or a destination network node; or if the control node is the source relay terminal, to send a first instruction message to the source terminal, and a second instruction message to a destination node, wherein the first instruction message and the second instruction message are sent after the deciding module decides to reselect a relay terminal; the first instruction message instructs the source terminal to stop data from being transmitted to the destination node, and the second instruction message instructs the destination node to stop data from being transmitted to the source terminal; and the destination node is a destination terminal or a destination network node.

An embodiment of the invention further provides a terminal, which is a source terminal or a source relay terminal, the terminal including:

a processor configured to read program from a memory, and to perform the processes of:

making a relay terminal reselection decision for a source terminal according to a relay terminal reselection trigger condition;

if it is decided to reselect a relay terminal, then determining a list of candidate relay terminals for the source terminal; and determining a destination relay terminal for the source terminal from the list of candidate relay terminals according to obtained assistance information;

a transceiver configured to be controlled by the processor to receive and transmit data; and the memory configured to store use for use by the processor in operation.

With the terminal, if the source relay terminal is not suitable for acting as a relay terminal any longer while the source terminal, the destination node, and the source relay terminal are moving, then the source terminal or the source relay terminal will reselect a destination relay terminal for the source terminal.

With the implementation above, the control node device instructs the source terminal or the destination node to stop data from being transmitted, upon deciding to reselect a relay terminal, so that a loss of data between the source terminal and the destination terminal while a relay terminal is being reselected can be avoided as many as possible.

In the embodiments of the invention, the control node makes the relay terminal reselection decision for the source terminal according to the relay terminal reselection trigger condition, and if the control node decides to reselect a relay terminal, then the control node will determine the list of candidate relay terminals for the source terminal, and determine the destination relay terminal for the source terminal from the list of candidate relay terminals according to the assistance information, where the control node is the source terminal or the source relay terminal, so that if the source relay terminal is not suitable for acting as a relay terminal any longer while the source terminal, the destination node, and the source relay terminal are moving, then the source terminal or the source relay terminal will reselect the destination relay terminal for the source terminal.

BRIEF DESCRIPTION OF THE DRAWINGS

In order to make the technical solutions according to the embodiments of the invention more apparent, the drawings to which a description of the embodiments refers is briefly introduced below; and apparently the drawings to be described below are illustrative of only some of the embodiments of the invention, and those ordinarily skilled in the art can further derive from these drawings other drawings without any inventive effort. In the drawings.

DETAILED DESCRIPTION OF THE EMBODIMENTS

In order to make the objects, technical solutions, and advantages of the invention more apparent, the invention is described below in further details with reference to the drawings, and apparently the embodiments described below are only a part but not all of the embodiments of the invention. Based upon the embodiments here of the invention, all the other embodiments which can occur to those ordinarily skilled in the art without any inventive effort shall fall into the scope of the invention.

First Embodiment

Figure 1:
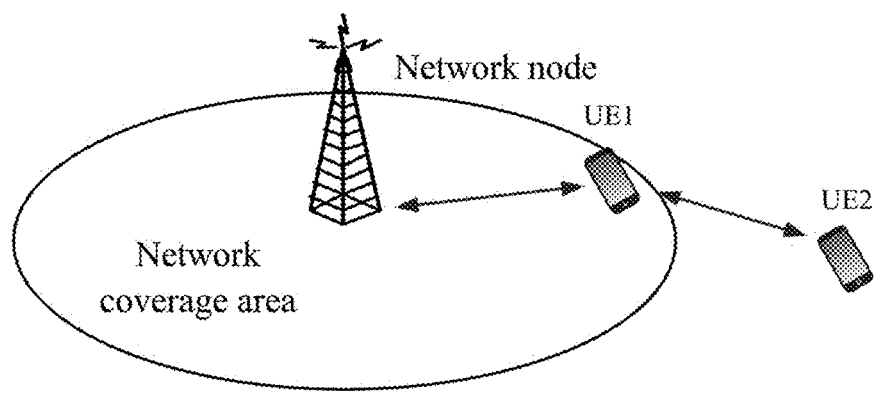
FIG. 1 is a schematic diagram of a D2D discovery or D2D communication between terminals through a UE-to-network relay in the prior art.
Figure 2:
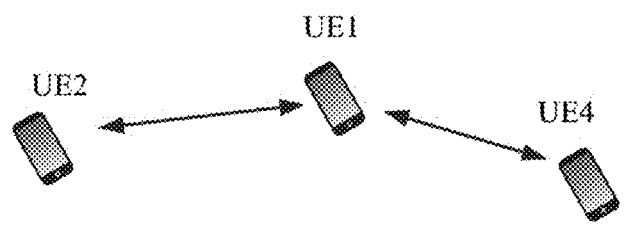
FIG. 2 is a schematic diagram of a D2D discovery or D2D communication between terminals through a UE-to-UE relay in the prior art.
Figure 3:
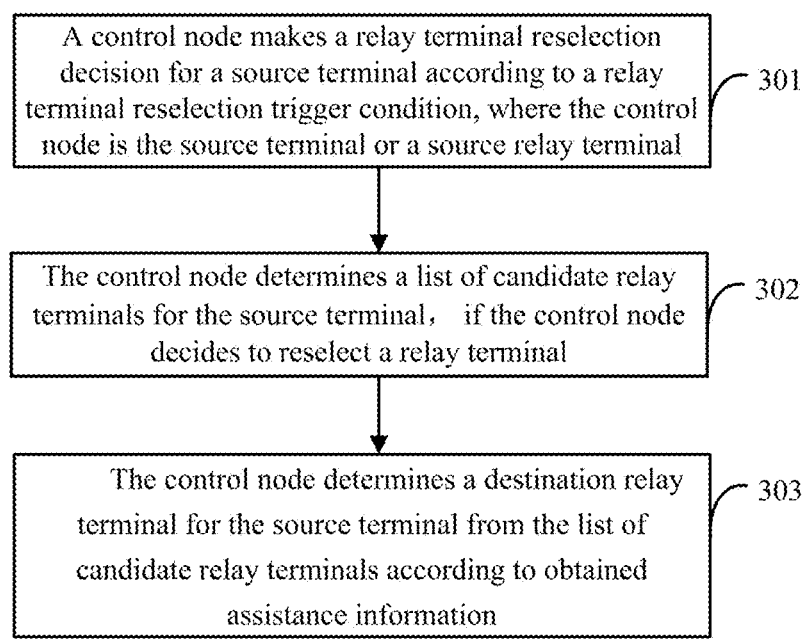
FIG. 3 is a schematic flow chart of a method for reselecting a relay terminal according to a first embodiment of the invention.

FIG. 3 illustrates a method for reselecting a relay terminal according to an embodiment of the invention, where the method includes the following steps:

In the step 301, a control node makes a relay terminal reselection decision for a source terminal according to a relay terminal reselection trigger condition, where the control node is the source terminal or a source relay terminal;

In the step 302, if the control node decides to reselect a relay terminal, then the control node determines a list of candidate relay terminals for the source terminal; and In the step 303, the control node determines a destination relay terminal for the source terminal from the list of candidate relay terminals according to obtained assistance information.

The flow above can be applicable to the UE-to-network relay scenario or the UE-to-UE relay scenario.

If the flow is applicable to the UE-to-UE relay scenario, then candidate relay terminals in the list of candidate relay terminals in the step 302 will include UE-to-UE relays, i.e., terminals adjacent to both the source terminal and a destination terminal, and capable of providing a relay service.

If the flow is applicable to the UE-to-network relay scenario, then candidate relay terminals in the list of candidate relay terminals in the step 302 will include UE-to-network relays, i.e., in-coverage terminals adjacent to the source terminal, and capable of providing a relay service, where an in-coverage terminal refers to a terminal in a coverage area of a network, and communicating directly with the network.

A flow of reselecting a relay terminal is described below respectively for different scenarios in the following several embodiments:

In a first scenario, a control node which is a source terminal reselects a relay terminal in the UE-to-UE relay scenario;

In a second scenario, a control node which is a source terminal reselects a relay terminal in the UE-to-network relay scenario;

In a third scenario, a control node which is a source relay terminal reselects a relay terminal in the UE-to-UE relay scenario; and In a fourth scenario, a control node which is a source relay terminal reselects a relay terminal in the UE-to-network relay scenario.

Second Embodiment

Figure 4:
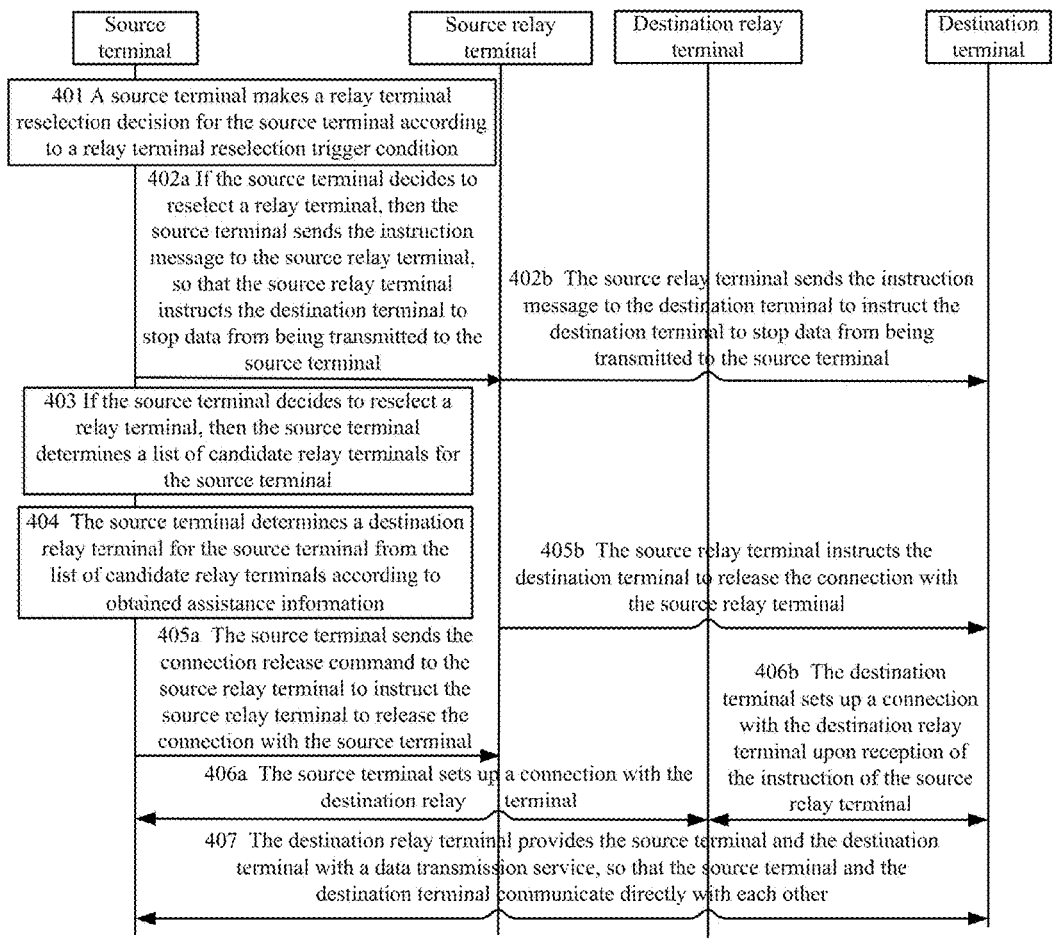
FIG. 4 is a schematic flow chart of a method for reselecting a relay terminal according to a second embodiment of the invention.

In the second embodiment, the flow of reselecting a relay terminal is described for the first scenario above. As illustrated in FIG. 4, particular steps in the flow are as follows:

In the step 401, a source terminal makes a relay terminal reselection decision for the source terminal according to a relay terminal reselection trigger condition;

Here in the step 401, the relay terminal reselection trigger condition includes at least one of the following conditions:

A first condition is that a channel quality or a signal received strength between the source terminal and the source relay terminal is below a preset threshold; or transmission still fails after the number of transmissions or retransmissions between the source terminal and the source relay terminal reaches a preset maximum number;

A second condition is that a channel quality or a signal received strength between the source terminal and a destination terminal is below a preset threshold; or transmission still fails after the number of transmissions or retransmissions between the source terminal and a destination terminal reaches a preset maximum number; and A third condition is that the source relay terminal is not suitable for acting as a relay terminal of the source terminal any longer, according to a relay strategy of the source relay terminal.

In an implementation, the relay strategy of the source relay terminal includes one or more of the following items: whether the source relay terminal has obtained authorization information for acting as a UE-to-UE relay, whether the remaining amount of power in the source relay terminal is suitable for providing a relay service, whether a load of the source relay terminal is suitable for providing a relay service, whether the source relay terminal is willing to provide a relay service, relative speeds of data transmission, or link interference conditions, between the source relay terminal and the source terminal, and between the source relay terminal and the destination terminal are suitable for acting as a relay terminal, etc.

If the relay terminal reselection trigger condition includes the first condition, then the first condition is measured by the source terminal, or measured by the source relay terminal, and fed back to the source terminal. Stated otherwise, the channel quality or the signal received strength between the source terminal and the source relay terminal, or the number of transmissions or retransmissions between the source terminal and the source relay terminal, as referred to in the first condition, is measured by the source terminal, or measured by the source relay terminal, and fed back to the source terminal.

If the relay terminal reselection trigger condition includes the second condition, then the second condition is measured by the source relay terminal, and fed back to the source terminal, or measured by the destination node, and fed back to the source terminal through the source relay terminal. Stated otherwise, the channel quality or the signal received strength between the source relay terminal and the destination terminal, or the number of transmissions or retransmissions between the source relay terminal and the destination terminal, as referred to in the second condition is measured by the source relay terminal, and fed back to the source terminal, or measured by the destination node, and fed back to the source terminal through the source relay terminal.

If the relay terminal reselection trigger condition includes the third condition, then the third condition is determined by the source relay terminal, and fed back to the source terminal. Stated otherwise, the relay strategy as referred to in the third condition is determined by the source relay terminal, and fed back to the source terminal.

Optionally the source relay terminal can feed the measured or received measurement result or relay strategy back to the source terminal in response to a request of the source terminal, or can feed the measured or received measurement result or relay strategy back to the source terminal on its own initiative upon determining that the relay terminal reselection trigger condition is satisfied.

In the step 402*a* and the step 402*b*, if the source terminal decides to reselect a relay terminal, then the source terminal sends an instruction message to the destination terminal through the source relay terminal to instruct the destination terminal to stop data from being transmitted to the source terminal, so that a loss of data between the source terminal and the destination terminal while a relay terminal is being reselected can be avoided as many as possible. Particularly as illustrated in FIG. 4:

In the step 402*a*, if the source terminal decides to reselect a relay terminal, then the source terminal sends the instruction message to the source relay terminal, so that the source relay terminal instructs the destination terminal to stop data from being transmitted to the source terminal; and In the step 402*b*, the source relay terminal sends the instruction message to the destination terminal to instruct the destination terminal to stop data from being transmitted to the source terminal.

In the step 403, if the source terminal decides to reselect a relay terminal, then the source terminal determines a list of candidate relay terminals for the source terminal, where candidate relay terminals in the list of candidate relay terminals are adjacent to both the source terminal and the destination terminal, and capable of providing a relay service;

The list of candidate relay terminals in the step 403 is determined by the source terminal in the following schemes:

In a first scheme, the source terminal receives a discovery signal broadcasted by an adjacent terminal, and if the discovery signal carries identification information of the destination terminal, and information indicating that the adjacent terminal is capable of providing the source terminal with a relay service, then the source terminal determines the adjacent terminal as a candidate relay terminal of the source terminal, and put identification information of the adjacent terminal into the list of candidate relay terminals, where the adjacent terminal carries the identification information of the destination terminal in the discovery signal after discovering the destination terminal.

Here in the first scheme, the information, carried in the discovery signal, indicating that the adjacent terminal is capable of providing the source terminal with a relay service refers to information indicating that the adjacent terminal is capable of being a UE-to-UE replay to provide the source terminal with a relay service. The discovery signal broadcasted by the adjacent terminal carries at least the identification information of the discovered destination terminal in addition to the identification information of the adjacent terminal. The information indicating whether the adjacent terminal is capable of providing the source terminal with a relay service is determined according to a relay strategy of the adjacent terminal, for example, whether the adjacent terminal has obtained authorization information for acting as a UE-to-UE relay, whether the remaining amount of power in the adjacent terminal is suitable for providing a relay service, whether a load of the adjacent terminal is suitable for providing a relay service, whether the adjacent terminal is willing to provide a relay service, relative speeds of data transmission, or link interference conditions, between the adjacent terminal and the source terminal, and between the adjacent terminal and the destination terminal are suitable for acting as a relay terminal, etc., where the relay strategy of the adjacent terminal includes one or more of the items exemplified as above.

In a second scheme, the source terminal broadcasts a discovery signal carrying identification information of the source terminal and the destination terminal, and information indicating that the source terminal needs a relay service, and if the source terminal receives discovery signal response information of an adjacent terminal, which carries information indicating that the adjacent terminal is capable of providing the source terminal with a relay service, then the source terminal determines the adjacent terminal as a candidate relay terminal of the source terminal, and put identification information of the adjacent terminal into the list of candidate relay terminals, where the adjacent terminal returns the discover signal response information to the source terminal upon discovering the terminal corresponding to the identification information of the destination terminal.

In the second scheme, the information, carried in the discovery signal, indicating that the source terminal needs a relay service refers to information indicating that the source terminal needs a relay service available from a UE-to-UE relay. The information, carried in the discovery signal response information, indicating that the adjacent terminal is capable of providing the source terminal with a relay service is information indicating that the adjacent terminal is capable of being a UE-to-UE relay to provide the source terminal with a relay service. The source terminal firstly receives the discovery signal response information sent by the adjacent terminal in the D2D discovery mechanism, and if the adjacent terminal is adjacent to the source terminal and the destination terminal, but also the adjacent terminal is capable of providing a relay service, then the source terminal determines the adjacent terminal as a candidate relay terminal. The adjacent terminal determines whether the adjacent terminal is capable of providing the source terminal and the discovered destination terminal with a relay service, according to the identification information of the source terminal in the received discovery signal from the source terminal, and a relay strategy of the adjacent terminal after discovering the terminal corresponding to the identification information of the destination terminal. For the relay strategy of the adjacent terminal in the second scheme, reference can be made to the relay strategy of the adjacent terminal in the first scheme, so a repeated description thereof is omitted here.

In the step 404, the source terminal determines a destination relay terminal for the source terminal from the list of candidate relay terminals according to obtained assistance information;

The assistance information in the step 404 includes at least one of the following information:

First assistance information which is channel qualities or signal received strengths between the source terminal and the candidate relay terminals; second assistance information which is channel qualities or signal received strengths between the candidate relay terminals and the destination terminal; and third assistance information which is relay strategies of the candidate relay terminals.

Here the relay strategy of a candidate relay terminal includes one or more of the following items: whether the candidate relay terminal has obtained authorization information for acting as a UE-to-UE relay, whether the remaining amount of power in the candidate relay terminal is suitable for providing a relay service, whether a load of the candidate relay terminal is suitable for providing a relay service, whether the candidate relay terminal is willing to provide a relay service, relative speeds of data transmission, or link interference conditions, between the candidate relay terminal and the source terminal, and between the candidate relay terminal and the destination terminal are suitable for acting as a relay terminal, etc.

The assistance information in the step 404 is obtained as follows:

If the assistance information includes the first assistance information, then the first assistance information is measured by the source terminal, or measured by the candidate relay terminals, and fed back to the source terminal;

If the assistance information includes the second assistance information, then the second assistance information is measured by the candidate relay terminal or the destination node, and fed back to the source terminal; and If the assistance information includes the third assistance information, then the third assistance information is determined by the candidate relay terminals, and fed back to the source terminal.

In an implementation, the assistance information is information measured or received by the source terminal, and the source terminal obtains the assistance information of the candidate relay terminals in the list of candidate relay terminals upon deciding to reselect a relay terminal, where the assistance information can be measured by the source terminal, or can be obtained by the source terminal as a result of requesting nodes adjacent thereto for feeding back the assistance information, where the nodes adjacent to the source terminal include the candidate relay terminals and the destination terminal.

In the step 405*a* and the step 405*b*, the source terminal sends a connection release command to the source relay terminal to instruct the source relay terminal to release the connection with the source terminal, and to instruct the source relay terminal to instruct the destination terminal to release the connection with the source relay terminal;

Particularly in the step 405*a*, the source terminal sends the connection release command to the source relay terminal to instruct the source relay terminal to release the connection with the source terminal, where the source relay terminal releasing the connection with the source terminal refers to the source relay terminal releasing Radio Resource Control (RRC), Packet Data Convergence Protocol (PDCP), Radio Link Control (RLC), Media Access Control (MAC), Physical Layer (PHY), and other configuration information related to the source terminal.

In the step 405b, the source relay terminal instructs the destination terminal to release the connection with the source relay terminal. The destination terminal releasing the connection with the source relay terminal refers to the destination terminal releasing RRC, PDCP, RLC, MAC, PHY, and other configuration information related to the source relay terminal and the source terminal, between the destination terminal and the source relay terminal.

In the step 406a, the source terminal sets up a connection with the destination relay terminal;

In the step 406b, the destination terminal sets up a connection with the destination relay terminal upon reception of the instruction of the source relay terminal, where the connection release command received by the source relay terminal in the step 405a carries information about the destination relay terminal.

The source terminal setting up the connection with the destination relay terminal, and the destination terminal setting up the connection with the destination relay terminal includes the source terminal or the destination terminal setting up an Internet Protocol (IP) connection with the destination relay terminal, and configuring underlying RRC, PDCP, RLC, MAC, and PHY layers.

In the step 407, the destination relay terminal provides the source terminal and the destination terminal with a data transmission service, so that the source terminal and the destination terminal communicate directly with each other.

In this embodiment of the invention, the source terminal makes the relay terminal reselection decision for the source terminal according to the relay terminal reselection trigger condition, and if the source terminal decides to reselect a relay terminal, then the source terminal determines the list of candidate relay terminals for the source terminal, and the source terminal determines the destination relay terminal for the source terminal from the list of candidate relay terminals according to the assistance information, so that if the source relay terminal is not suitable for acting as a relay terminal any longer while the source terminal, the destination node, and the source relay terminal are moving, then the source terminal reselects the destination relay terminal for the source terminal.

Third Embodiment

Figure 5:
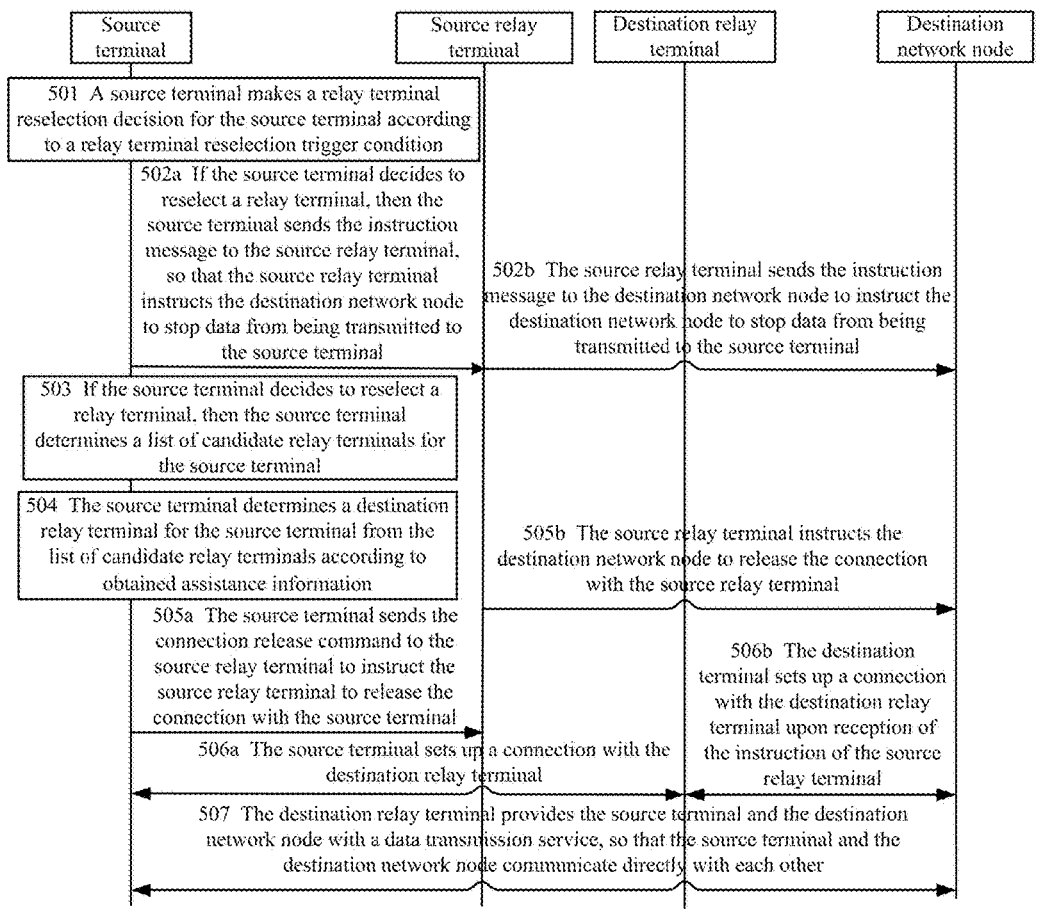
FIG. 5 is a schematic flow chart of a method for reselecting a relay terminal according to a third embodiment of the invention.

In the third embodiment, the flow of reselecting a relay terminal is described for the second scenario above. As illustrated in FIG. 5, particular steps in the flow are as follows:

In the step 501, a source terminal makes a relay terminal reselection decision for the source terminal according to a relay terminal reselection trigger condition;

Here in the step 501, the relay terminal reselection trigger condition includes at least one of the following conditions:

A first condition is that a channel quality or a signal received strength between the source terminal and the source relay terminal is below a preset threshold; or transmission still fails after the number of transmissions or retransmissions between the source terminal and the source relay terminal reaches a preset maximum number;

A second condition is that a channel quality or a signal received strength between the source relay terminal and a destination network node is below a preset threshold; or transmission still fails after the number of transmissions or retransmissions between the source relay terminal and a destination network node reaches a preset maximum number; and A third condition is that the source relay terminal is not suitable for acting as a relay terminal of the source terminal any longer, according to a relay strategy of the source relay terminal.

Here the relay strategy of the source relay terminal includes one or more of the following items: whether the source relay terminal has obtained authorization information for acting as a UE-to-network relay, whether the remaining amount of power in the source relay terminal is suitable for providing a relay service, whether a load of the source relay terminal is suitable for providing a relay service, whether the source relay terminal is willing to provide a relay service, relative speeds of data transmission, or link interference conditions, between the source relay terminal and the source terminal, and between the source relay terminal and the destination network node are suitable for acting as a relay terminal, etc.

If the relay terminal reselection trigger condition includes the first condition, then the first condition is measured by the source terminal, or measured by the source relay terminal, and fed back to the source terminal. Stated otherwise, the channel quality or the signal received strength between the source terminal and the source relay terminal, or the number of transmissions or retransmissions between the source terminal and the source relay terminal, as referred to in the first condition, is measured by the source terminal, or measured by the source relay terminal, and fed back to the source terminal.

If the relay terminal reselection trigger condition includes the second condition, then the second condition is measured by the source relay terminal, and fed back to the source terminal, or measured by the destination node, and fed back to the source terminal through the source relay terminal. Stated otherwise, the channel quality or the signal received strength between the source relay terminal and the destination terminal, or the number of transmissions or retransmissions between the relay source terminal and the destination terminal, as referred to in the second condition is measured by the source relay terminal, and fed back to the source terminal, or measured by the destination node, and fed back to the source terminal through the source relay terminal.

If the relay terminal reselection trigger condition includes the third condition, then the third condition is determined by the source relay terminal, and fed back to the source terminal. Stated otherwise, the relay strategy as referred to in the third condition is determined by the source relay terminal, and fed back to the source terminal.

Optionally the source relay terminal can feed the measured or received measurement result or relay strategy back to the source terminal in response to a request of the source terminal, or can feed the measured or received measurement result or relay strategy back to the source terminal on its own initiative upon determining that the relay terminal reselection trigger condition is satisfied.

In the step 502a and the step 502b, if the source terminal decides to reselect a relay terminal, then the source terminal sends an instruction message to the destination network node through the source relay terminal to instruct the destination network node to stop data from being transmitted to the source terminal, so that a loss of data between the source terminal and the destination network node while a relay terminal is being reselected can be avoided as many as possible. Particularly as illustrated in FIG. 5:

In the step 502a, if the source terminal decides to reselect a relay terminal, then the source terminal sends the instruction message to the source relay terminal, so that the source relay terminal instructs the destination network node to stop data from being transmitted to the source terminal; and In the step 502b, the source relay terminal sends the instruction message to the destination network node to instruct the destination network node to stop data from being transmitted to the source terminal.

In the step 503, if the source terminal decides to reselect a relay terminal, then the source terminal determines a list of candidate relay terminals for the source terminal, where candidate relay terminals in the list of candidate relay terminals are in-coverage terminals adjacent to the source terminal, and capable of providing a relay service;

The list of candidate relay terminals in the step 503 is determined by the source terminal in the following schemes:

In a first scheme, the source terminal receives a discovery signal broadcasted by an adjacent terminal, and if the discovery signal carries information indicating that the adjacent terminal is capable of providing the source terminal with a relay service, then the source terminal determines the adjacent terminal as a candidate relay terminal of the source terminal, and put identification information of the adjacent terminal into the list of candidate relay terminals.

In a second scheme, the source terminal broadcasts a discovery signal carrying identification information of the source terminal, and information indicating that the source terminal needs a relay service, and if the source terminal receives discovery signal response information of an adjacent terminal, which carries information indicating that the adjacent terminal is capable of providing the source terminal with a relay service, then the source terminal determines the adjacent terminal as a candidate relay terminal of the source terminal, and put identification information of the adjacent terminal into the list of candidate relay terminals.

Here in the first scheme, the information, carried in the discovery signal, indicating that the adjacent terminal is capable of providing the source terminal with a relay service refers to information indicating that the adjacent terminal is capable of being a UE-to-network replay to provide the source terminal with a relay service.

In the second scheme, the information, carried in the discovery signal, indicating that the source terminal needs a relay service refers to information indicating that the source terminal needs a relay service available from a UE-to-network relay. The information, carried in the discovery signal response information, indicating that the adjacent terminal is capable of providing the source terminal with a relay service is information indicating that the adjacent terminal is capable of being a UE-to-network relay to provide the source terminal with a relay service.

In the two schemes above, an in-coverage terminal adjacent to the source terminal is determined in the D2D discovery mechanism, and whether the in-coverage terminal is capable of providing a relay service is determined by a strategy of the in-coverage terminal, for example, whether the in-coverage terminal has obtained authorization information for acting as a UE-to-network relay, whether the remaining amount of power in the in-coverage terminal is suitable for providing a relay service, whether a load of the in-coverage terminal is suitable for providing a relay service, whether the in-coverage terminal is willing to provide a relay service, relative speeds of data transmission, or link interference conditions, between the in-coverage terminal and the source terminal, and between the in-coverage terminal and the destination network node are suitable for acting as a relay terminal, etc. The strategy of the in-coverage terminal includes one or more of the items exemplified as above. If the in-coverage terminal is adjacent to the source terminal, but also the in-coverage terminal is suitable for providing a relay service, according to the strategy of the in-coverage terminal, then the in-coverage terminal is determined as a candidate relay terminal.

In the step 504, the source terminal determines a destination relay terminal for the source terminal from the list of candidate relay terminals according to obtained assistance information;

The assistance information in the step 504 includes at least one of the following information:

First assistance information which is channel qualities or signal received strengths between the source terminal and the candidate relay terminals; second assistance information which is channel qualities or signal received strengths between the candidate relay terminals and the destination network node; and third assistance information which is relay strategies of the candidate relay terminals.

Here the relay strategy of a candidate relay terminal includes one or more of the following items: whether the candidate relay terminal has obtained authorization information for acting as a UE-to-network relay, whether the remaining amount of power in the candidate relay terminal is suitable for providing a relay service, whether a load of the candidate relay terminal is suitable for providing a relay service, whether the candidate relay terminal is willing to provide a relay service, relative speeds of data transmission, or link interference conditions, between the candidate relay terminal and the source terminal, and between the candidate relay terminal and the destination network node are suitable for acting as a relay terminal, etc.

The assistance information in the step 504 is obtained as follows: if the assistance information includes the first assistance information, then the first assistance information is measured by the source terminal, or measured by the candidate relay terminals, and fed back to the source terminal;

If the assistance information includes the second assistance information, then the second assistance information is measured by the candidate relay terminal or the destination network node, and fed back to the source terminal; and If the assistance information includes the third assistance information, then the third assistance information is determined by the candidate relay terminals, and fed back to the source terminal.

In an implementation, the assistance information is information measured or received by the source terminal, and optionally the source terminal obtains the assistance information of the candidate relay terminals in the list of candidate relay terminals upon deciding to reselect a relay terminal, where the assistance information can be measured by the source terminal, or can be obtained by the source terminal as a result of requesting nodes adjacent thereto for feeding back the assistance information, where the nodes adjacent to the source terminal include the candidate relay terminals and the destination network node.

In the step 505a and the step 505b, the source terminal sends a connection release command to the source relay terminal to instruct the source relay terminal to release the connection with the source terminal, and to instruct the source relay terminal to instruct the destination network node to release the connection with the source relay terminal;

Particularly in the step 505a, the source terminal sends the connection release command to the source relay terminal to instruct the source relay terminal to release the connection with the source terminal, where the source relay terminal releasing the connection with the source terminal refers to the source relay terminal releasing RRC, PDCP, RLC, MAC, PHY, and other configuration information related to the source terminal.

In the step 505b, the source relay terminal instructs the destination network node to release the connection with the source relay terminal. The destination network node releasing the connection with the source relay terminal refers to the destination network node releasing RRC, PDCP, RLC, MAC, PHY, and other configuration information related to the source terminal, between the destination terminal and the source relay terminal.

In the step 506a, the source terminal sets up a connection with the destination relay terminal;

In the step 506b, the destination terminal sets up a connection with the destination relay terminal upon reception of the instruction of the source relay terminal, where the connection release command received by the source relay terminal in the step 505a carries information about the destination relay terminal.

The source terminal setting up the connection with the destination relay terminal, and the destination network node setting up the connection with the destination relay terminal includes the source terminal or the destination terminal setting up an IP connection with the destination relay terminal, and configuring underlying RRC, PDCP, RLC, MAC, and PHY layers.

In the step 507, the destination relay terminal provides the source terminal and the destination network node with a data transmission service, so that the source terminal and the destination network node communicate directly with each other.

In this embodiment of the invention, the source terminal makes the relay terminal reselection decision for the source terminal according to the relay terminal reselection trigger condition, and if the source terminal decides to reselect a relay terminal, then the source terminal determines the list of candidate relay terminals for the source terminal, and the source terminal determines the destination relay terminal for the source terminal from the list of candidate relay terminals according to the assistance information, so that if the source relay terminal is not suitable for acting as a relay terminal any longer while the source terminal, the destination network node, and the source relay terminal are moving, then the source terminal reselects the destination relay terminal for the source terminal.

Fourth Embodiment

Figure 6:
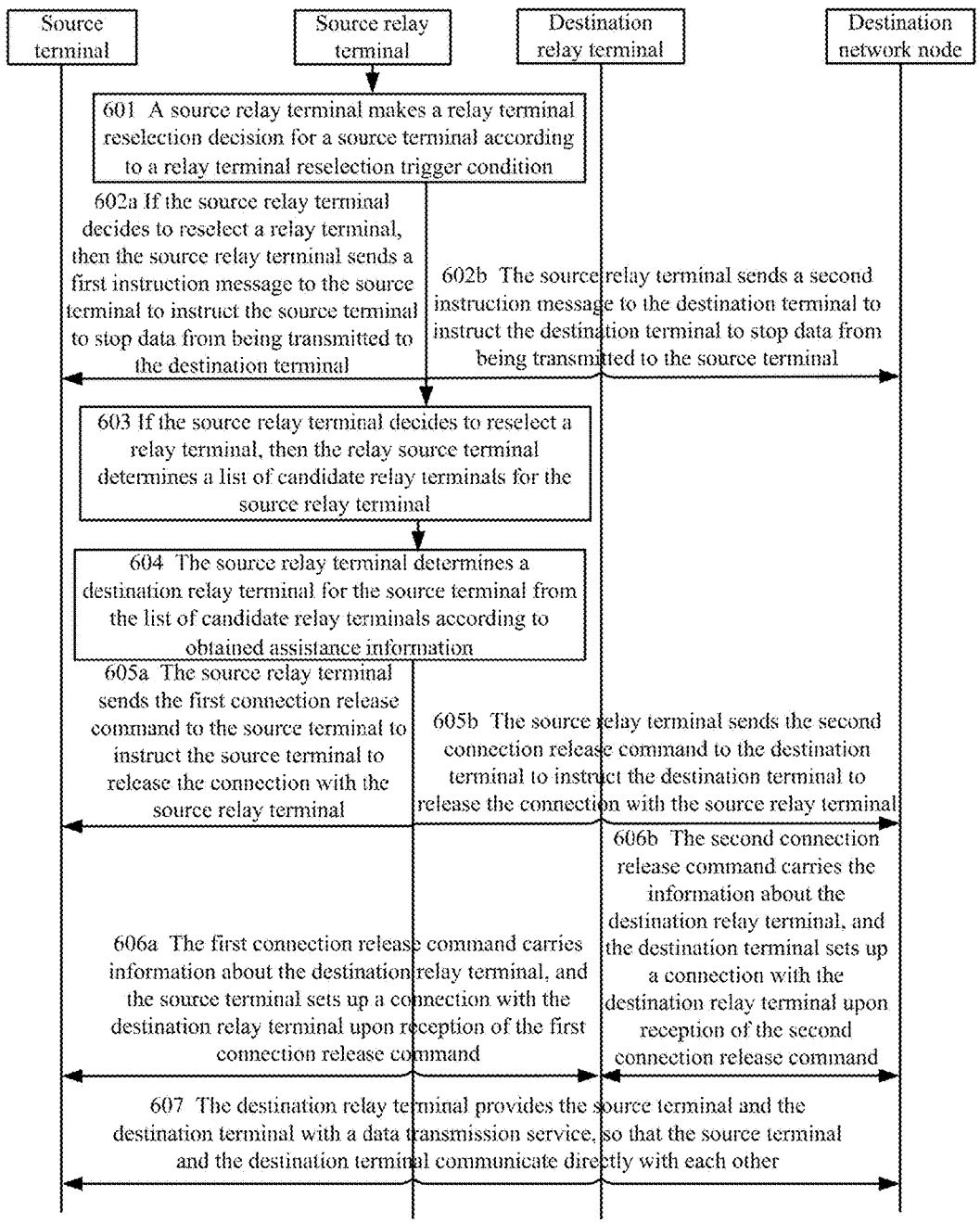
FIG. 6 is a schematic flow chart of a method for reselecting a relay terminal according to a fourth embodiment of the invention.

In the fourth embodiment, the flow of reselecting a relay terminal is described for the third scenario above. As illustrated in FIG. 6, particular steps in the flow are as follows:

In the step 601, a source relay terminal makes a relay terminal reselection decision for a source terminal according to a relay terminal reselection trigger condition;

Here in the step 601, the relay terminal reselection trigger condition includes at least one of the following conditions:

A first condition is that a channel quality or a signal received strength between the source terminal and the source relay terminal is below a preset threshold; or transmission still fails after the number of transmissions or retransmissions between the source terminal and the source relay terminal reaches a preset maximum number;

A second condition is that a channel quality or a signal received strength between the source relay terminal and a destination terminal is below a preset threshold; or transmission still fails after the number of transmissions or retransmissions between the source relay terminal and a destination terminal reaches a preset maximum number; and A third condition is that the source relay terminal is not suitable for acting as a relay terminal of the source terminal any longer, according to a relay strategy of the source relay terminal.

The relay strategy of the source relay terminal includes one or more of the following items: whether the source relay terminal has obtained authorization information for acting as a UE-to-UE relay, whether the remaining amount of power in the source relay terminal is suitable for providing a relay service, whether a load of the source relay terminal is suitable for providing a relay service, whether the source relay terminal is willing to provide a relay service, relative speeds of data transmission, or link interference conditions, between the source relay terminal and the source terminal, and between the source relay terminal and the destination terminal are suitable for acting as a relay terminal, etc.

If the relay terminal reselection trigger condition includes the first condition, then the first condition is measured by the source terminal, and fed back to the source relay terminal, or measured by the source relay terminal. Stated otherwise, the channel quality or the signal received strength between the source terminal and the source relay terminal, or the number of transmissions or retransmissions between the source terminal and the source relay terminal, as referred to in the first condition, is measured by the source relay terminal, or measured by the source terminal, and fed back to the source relay terminal.

If the relay terminal reselection trigger condition includes the second condition, then the second condition is measured by the source relay terminal, or measured by the destination node, and fed back to the source relay terminal. Stated otherwise, the channel quality or the signal received strength between the source relay terminal and the destination node, or the number of transmissions or retransmissions between the source relay terminal and the destination node, as referred to in the second condition is measured by the source relay terminal, or measured by the destination node, and fed back to the source relay terminal.

If the relay terminal reselection trigger condition includes the third condition, then the third condition is determined by the source relay terminal. Stated otherwise, the relay strategy as referred to in the third condition is determined by the source relay terminal.

Optionally the source terminal or the destination terminal can feed the measured or received measurement result back to the source relay terminal in response to a request of the source relay terminal, or the source terminal can feed the measured or received measurement result back to the source relay terminal on its own initiative upon determining that the relay terminal reselection trigger condition is satisfied.

In the step 602a and the step 602b, if the source relay terminal decides to reselect a relay terminal, then the source relay terminal sends an instruction message to the source terminal and the destination terminal to instruct the source terminal and the destination terminal to stop data from being transmitted to the source terminal, so that a loss of data between the source terminal and the destination terminal while a relay terminal is being reselected can be avoided as many as possible. Particularly as illustrated in FIG. 6:

In the step 602a, if the source relay terminal decides to reselect a relay terminal, then the source relay terminal sends a first instruction message to the source terminal to instruct the source terminal to stop data from being transmitted to the destination terminal; and In the step 602b, the source relay terminal sends a second instruction message to the destination terminal to instruct the destination terminal to stop data from being transmitted to the source terminal.

In the step 603, if the source relay terminal decides to reselect a relay terminal, then the relay source terminal determines a list of candidate relay terminals for the source relay terminal, where candidate relay terminals in the list of candidate relay terminals are adjacent to both the source terminal and the destination terminal, and capable of providing a relay service;

The list of candidate relay terminals in the step 603 is determined by the source terminal, and fed back to the source relay terminal, where the source terminal determines the list of candidate relay terminals as described in the step 403 in the second embodiment, so a repeated description thereof is omitted there.

In the step 604, the source relay terminal determines a destination relay terminal for the source terminal from the list of candidate relay terminals according to obtained assistance information;

The assistance information in the step 604 includes at least one of the following information:

First assistance information which is channel qualities or signal received strengths between the source terminal and the candidate relay terminals; second assistance information which is channel qualities or signal received strengths between the candidate relay terminals and the destination terminal; and third assistance information which is relay strategies of the candidate relay terminals.

Here the relay strategy of a candidate relay terminal includes one or more of the following items: whether the candidate relay terminal has obtained authorization information for acting as a UE-to-UE relay, whether the remaining amount of power in the candidate relay terminal is suitable for providing a relay service, whether a load of the candidate relay terminal is suitable for providing a relay service, whether the candidate relay terminal is willing to provide a relay service, relative speeds of data transmission, or link interference conditions, between the candidate relay terminal and the source terminal, and between the candidate relay terminal and the destination terminal are suitable for acting as a relay terminal, etc. The assistance information in the step 604 is obtained as follows: if the assistance information includes the first assistance information, then the first assistance information is measured by the source terminal, and fed back to the source relay terminal, or measured by the candidate relay terminals, and fed back to the source relay terminal through the source terminal;

If the assistance information includes the second assistance information, then the second assistance information is measured by the destination terminal, and fed back to the source relay terminal, or measured by the candidate relay terminals, and fed back to the source relay terminal through the destination terminal; and If the assistance information includes the third assistance information, then the third assistance information is determined by the candidate relay terminals, and fed back to the source relay terminal through the source terminal or the destination node.

The assistance information is information measured or received by the source relay terminal, and optionally the source terminal obtains the assistance information of the candidate relay terminals in the list of candidate relay terminals upon deciding to reselect a relay terminal, where the assistance information can be measured by the source terminal, or can be obtained by the source terminal as a result of requesting nodes adjacent thereto for feeding back the assistance information, where the nodes adjacent to the source terminal include the candidate relay terminals and the destination terminal.

In the step 605a and the step 605b, the source relay terminal sends a first connection release command to the source terminal to instruct the source terminal to release the connection with the source relay terminal, and a second connection release command to the destination terminal to instruct the destination terminal to release the connection with the source relay terminal;

In the step 605a, the source relay terminal sends the first connection release command to the source terminal to instruct the source terminal to release the connection with the source relay terminal, where the source terminal releasing the connection with the source relay terminal refers to the source relay terminal releasing RRC, PDCP, RLC, MAC, PHY, and other configuration information related to the source terminal.

In the step 605b, the source relay terminal sends the second connection release command to the destination terminal to instruct the destination terminal to release the connection with the source relay terminal.

The destination terminal releasing the connection with the source relay terminal refers to the destination terminal releasing the connection with the source relay terminal RRC, PDCP, RLC, MAC, PHY, and other configuration information related to the source terminal, between the destination terminal and the source relay terminal.

In the step 606a, the first connection release command carries information about the destination relay terminal, and the source terminal sets up a connection with the destination relay terminal upon reception of the first connection release command;

In the step 606b, the second connection release command carries the information about the destination relay terminal, and the destination terminal sets up a connection with the destination relay terminal upon reception of the second connection release command; and The source terminal setting up the connection with the destination relay terminal, and the destination terminal setting up the connection with the destination relay terminal includes the source terminal or the destination terminal setting up an IP connection with the destination relay terminal, and configuring underlying RRC, PDCP, RLC, MAC, and PHY layers.

In the step 607, the destination relay terminal provides the source terminal and the destination terminal with a data transmission service, so that the source terminal and the destination terminal communicate directly with each other.

In this embodiment of the invention, the source relay terminal makes the relay terminal reselection decision for the source terminal according to the relay terminal reselection trigger condition, and if the source relay terminal decides to reselect a relay terminal, then the source relay terminal determines the list of candidate relay terminals for the source terminal, and the source relay terminal determines the destination relay terminal for the source terminal from the list of candidate relay terminals according to the assistance information, so that if the source relay terminal is not suitable for acting as a relay terminal any longer while the source terminal, the destination node, and the source relay terminal are moving, then the source relay terminal reselects the destination relay terminal for the source terminal.

Fifth Embodiment

Figure 7:
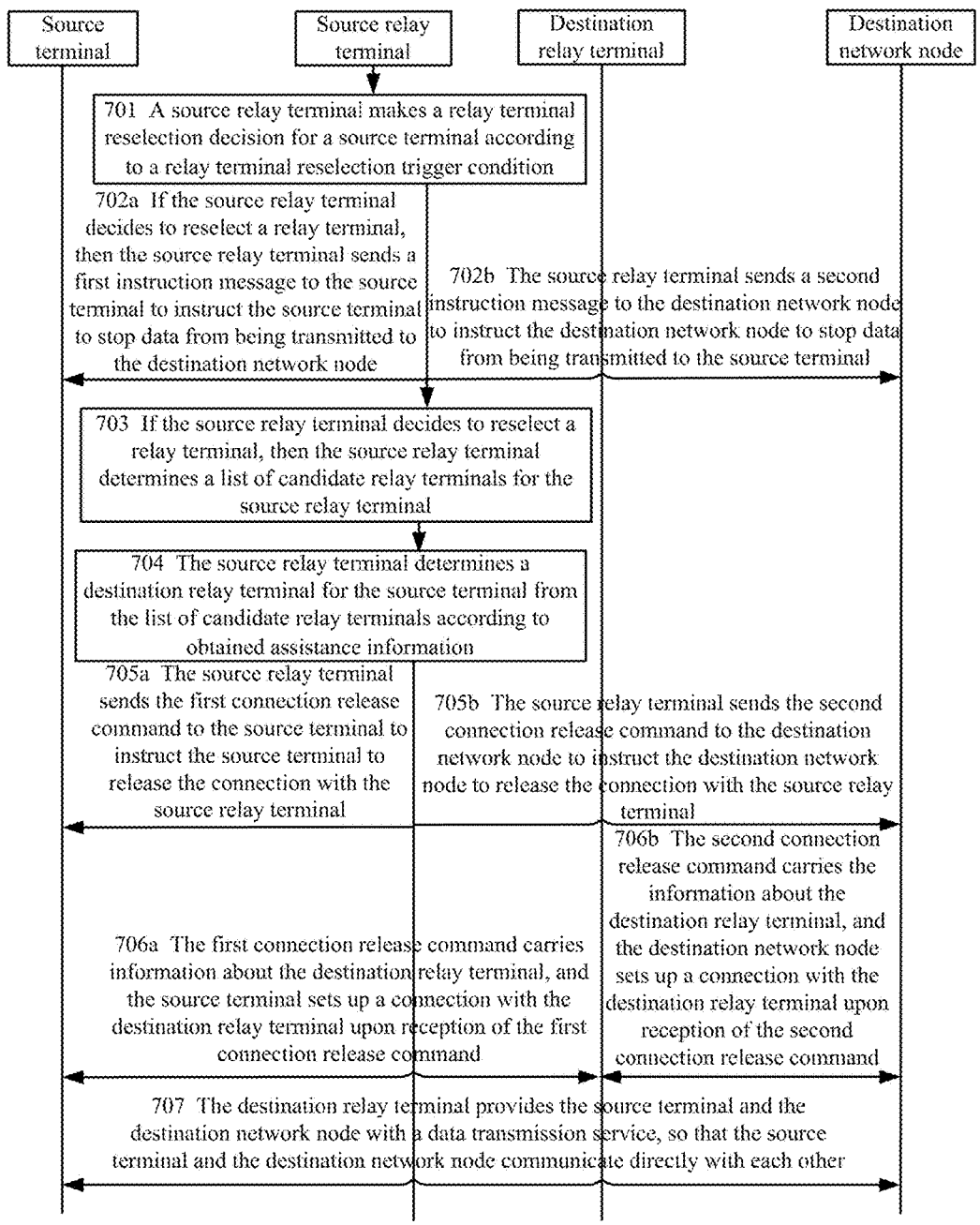
FIG. 7 is a schematic flow chart of a method for reselecting a relay terminal according to a fifth embodiment of the invention.

In the fifth embodiment, the flow of reselecting a relay terminal is described for the fourth scenario above. As illustrated in FIG. 7, particular steps in the flow are as follows:

In the step 701, a source relay terminal makes a relay terminal reselection decision for a source terminal according to a relay terminal reselection trigger condition;

Here in the step 701, the relay terminal reselection trigger condition includes at least one of the following conditions:

A first condition is that a channel quality or a signal received strength between the source terminal and the source relay terminal is below a preset threshold; or transmission still fails after the number of transmissions or retransmissions between the source terminal and the source relay terminal reaches a preset maximum number;

A second condition is that a channel quality or a signal received strength between the source relay terminal and a destination network node is below a preset threshold; or transmission still fails after the number of transmissions or retransmissions between the source relay terminal and a destination network node reaches a preset maximum number; and A third condition is that the source relay terminal is not suitable for acting as a relay terminal of the source terminal any longer, according to a relay strategy of the source relay terminal.

Here the relay strategy of the source relay terminal includes one or more of the following items: whether the source relay terminal has obtained authorization information for acting as a UE-to-network relay, whether the remaining amount of power in the source relay terminal is suitable for providing a relay service, whether a load of the source relay terminal is suitable for providing a relay service, whether the source relay terminal is willing to provide a relay service, relative speeds of data transmission, or link interference conditions, between the source relay terminal and the source terminal, and between the source relay terminal and the destination network node are suitable for acting as a relay terminal, etc.

If the relay terminal reselection trigger condition includes the first condition, then the first condition is measured by the source terminal, and fed back to the source relay terminal, or measured by the source relay terminal. Stated otherwise, the channel quality or the signal received strength between the source terminal and the source relay terminal, or the number of transmissions or retransmissions between the source terminal and the source relay terminal, as referred to in the first condition, is measured by the source relay terminal, or measured by the source terminal, and fed back to the source relay terminal.

If the relay terminal reselection trigger condition includes the second condition, then the second condition is measured by the source relay terminal, or measured by the destination node, and fed back to the source relay terminal. Stated otherwise, the channel quality or the signal received strength between the source relay terminal and the destination node, or the number of transmissions or retransmissions between the source relay terminal and the destination node, as referred to in the second condition is measured by the source relay terminal, or measured by the destination node, and fed back to the source relay terminal.

If the relay terminal reselection trigger condition includes the third condition, then the third condition is determined by the source relay terminal. Stated otherwise, the relay strategy as referred to in the third condition is determined by the source relay terminal.

The source terminal or the destination network node can feed the measured or received measurement result back to the source relay terminal in response to a request of the source relay terminal, or the source terminal can feed the measured or received measurement result back to the source relay terminal on its own initiative upon determining that the relay terminal reselection trigger condition is satisfied.

In the step 702a and the step 702b, if the source relay terminal decides to reselect a relay terminal, then the source relay terminal sends an instruction message to the source terminal and the destination network node to instruct the source terminal and the destination network node to stop data from being transmitted to the source terminal, so that a loss of data between the source terminal and the destination network node while a relay terminal is being reselected can be avoided as many as possible. Particularly as illustrated in FIG. 7:

In the step 702a, if the source relay terminal decides to reselect a relay terminal, then the source relay terminal sends a first instruction message to the source terminal to instruct the source terminal to stop data from being transmitted to the destination network node; and In the step 702b, the source relay terminal sends a second instruction message to the destination network node to instruct the destination network node to stop data from being transmitted to the source terminal.

In the step 703, if the source relay terminal decides to reselect a relay terminal, then the source relay terminal determines a list of candidate relay terminals for the source relay terminal, where candidate relay terminals in the list of candidate relay terminals are adjacent to the source terminal, and capable of providing a relay service;

The list of candidate relay terminals in the step 703 is determined by the source terminal, and fed back to the source relay terminal, where the source terminal determines the list of candidate relay terminals as described in the step 503 in the second embodiment, so a repeated description thereof is omitted there.

In the step 704, the source relay terminal determines a destination relay terminal for the source terminal from the list of candidate relay terminals according to obtained assistance information;

The assistance information in the step 704 includes at least one of the following information:

First assistance information which is channel qualities or signal received strengths between the source terminal and the candidate relay terminals; second assistance information which is channel qualities or signal received strengths between the candidate relay terminals and the destination network node; and third assistance information which is relay strategies of the candidate relay terminals.

Here the relay strategy of a candidate relay terminal includes one or more of the following items: whether the candidate relay terminal has obtained authorization information for acting as a UE-to-network relay, whether the remaining amount of power in the candidate relay terminal is suitable for providing a relay service, whether a load of the candidate relay terminal is suitable for providing a relay service, whether the candidate relay terminal is willing to provide a relay service, relative speeds of data transmission, or link interference conditions, between the candidate relay terminal and the source terminal, and between the candidate relay terminal and the destination network node are suitable for acting as a relay terminal, etc.

The assistance information in the step 704 is obtained as follows: if the assistance information includes the first assistance information, then the first assistance information is measured by the source terminal, and fed back to the source relay terminal, or measured by the candidate relay terminals, and fed back to the source relay terminal through the source terminal;

If the assistance information includes the second assistance information, then the second assistance information is measured by the destination network node, and fed back to the source relay terminal, or measured by the candidate relay terminals, and fed back to the source relay terminal through the destination network node; and If the assistance information includes the third assistance information, then the third assistance information is determined by the candidate relay terminals, and fed back to the source relay terminal through the source terminal or the destination network node.

The assistance information is information measured or received by the source relay terminal, and optionally the source terminal obtains the assistance information of the candidate relay terminals in the list of candidate relay terminals upon deciding to reselect a relay terminal, where the assistance information can be measured by the source terminal, or can be obtained by the source terminal as a result of requesting nodes adjacent thereto for feeding back the assistance information, where the nodes adjacent to the source terminal include the candidate relay terminals and the destination network node.

In the step 705a and the step 705b, the source relay terminal sends a first connection release command to the source terminal to instruct the source terminal to release the connection with the source relay terminal, and a second connection release command to the destination network node to instruct the destination network node to release the connection with the source relay terminal;

In the step 705a, the source relay terminal sends the first connection release command to the source terminal to instruct the source terminal to release the connection with the source relay terminal, where the source terminal releasing the connection with the source relay terminal refers to the source relay terminal releasing RRC, PDCP, RLC, MAC, PHY, and other configuration information related to the source terminal.

In the step 705b, the source relay terminal sends the second connection release command to the destination network node to instruct the destination network node to release the connection with the source relay terminal. The destination network node releasing the connection with the source relay terminal refers to the destination network node releasing the connection with the source relay terminal RRC, PDCP, RLC, MAC, PHY, and other configuration information related to the source terminal, between the destination network node and the source relay terminal.

In the step 706a, the first connection release command carries information about the destination relay terminal, and the source terminal sets up a connection with the destination relay terminal upon reception of the first connection release command;

In the step 706b, the second connection release command carries the information about the destination relay terminal, and the destination network node sets up a connection with the destination relay terminal upon reception of the second connection release command; and The source terminal setting up the connection with the destination relay terminal, and the destination network node setting up the connection with the destination relay terminal includes the source terminal or the destination network node setting up an IP connection with the destination relay terminal, and configuring underlying RRC, PDCP, RLC, MAC, and PHY layers.

In the step 707, the destination relay terminal provides the source terminal and the destination network node with a data transmission service, so that the source terminal and the destination network node communicate directly with each other.

In this embodiment of the invention, the source relay terminal makes the relay terminal reselection decision for the source terminal according to the relay terminal reselection trigger condition, and if the source relay terminal decides to reselect a relay terminal, then the source relay terminal determines the list of candidate relay terminals for the source terminal, and the source relay terminal determines the destination relay terminal for the source terminal from the list of candidate relay terminals according to the assistance information, so that if the source relay terminal is not suitable for acting as a relay terminal any longer while the source terminal, the destination network node, and the source relay terminal are moving, then the source relay terminal reselects the destination relay terminal for the source terminal.

Based upon the same technical idea, embodiments of the invention further provide control node devices, and for details of these control node devices, reference can be made to the embodiments above of the method, so a repeated description thereof is omitted here.

Sixth Embodiment

Figure 8:
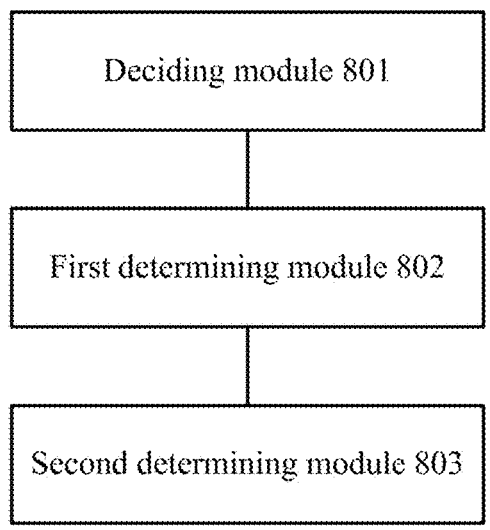
FIG. 8 is a schematic structural diagram of a control node device according to a sixth embodiment of the invention.

FIG. 8 illustrates a control node device according to an embodiment of the invention, where a control node device is the source terminal or a source relay terminal, and the control node device includes:

A deciding module 801 is configured to make a relay terminal reselection decision for a source terminal according to a relay terminal reselection trigger condition;

A first determining module 802 is configured, if it is decided to reselect a relay terminal, to determine a list of candidate relay terminals for the source terminal; and A second determining module 803 is configured to determine a destination relay terminal for the source terminal from the list of candidate relay terminals according to obtained assistance information.

Preferably the list of candidate relay terminals includes terminals adjacent to both the source terminal and a destination terminal, and capable of providing a relay service.

Preferably the first determining module 802 is configured:

If the control node device is the source terminal, to receive a discovery signal broadcasted by an adjacent terminal, and if the discovery signal carries identification information of the destination terminal, and information indicating that the adjacent terminal is capable of providing the source terminal with a relay service, to determine the adjacent terminal as a candidate relay terminal of the source terminal, and to put identification information of the adjacent terminal into the list of candidate relay terminals, where the adjacent terminal carries the identification information of the destination terminal in the discovery signal after discovering the destination terminal; or If the control node device is the source terminal, to broadcast a discovery signal carrying identification information of the source terminal and the destination terminal, and information indicating that the source terminal needs a relay service, and if the source terminal receives discovery signal response information of an adjacent terminal, which carries information indicating that the adjacent terminal is capable of providing the source terminal with a relay service, to determine the adjacent terminal as a candidate relay terminal of the source terminal, and to put identification information of the adjacent terminal into the list of candidate relay terminals, where the adjacent terminal returns the discover signal response information to the source terminal upon discovering the terminal corresponding to the identification information of the destination terminal; or If the control node device is the source relay terminal, to receive the list of candidate relay terminals determined and fed back by the source terminal.

Preferably the list of candidate relay terminals includes in-coverage terminals adjacent to the source terminal, and capable of providing a relay service.

Preferably the first determining module 802 is configured:

If the control node device is the source terminal, to receive a discovery signal broadcasted by an adjacent terminal, and if the discovery signal carries information indicating that the adjacent terminal is capable of providing the source terminal with a relay service, to determine the adjacent terminal as a candidate relay terminal of the source terminal, and to put identification information of the adjacent terminal into the list of candidate relay terminals; or If the control node device is the source terminal, to broadcast a discovery signal carrying identification information of the source terminal, and information indicating that the source terminal needs a relay service, and if the source terminal receives discovery signal response information of an adjacent terminal, which carries information indicating that the adjacent terminal is capable of providing the source terminal with a relay service, to determine the adjacent terminal as a candidate relay terminal of the source terminal, and to put identification information of the adjacent terminal into the list of candidate relay terminals; or If the control node device is the source relay terminal, to receive the list of candidate relay terminals determined and fed back by the source terminal.

Preferably the relay terminal reselection trigger condition includes at least one of the following conditions:

A first condition is that a channel quality or a signal received strength between the source terminal and the source relay terminal is below a preset threshold; or transmission still fails after the number of transmissions or retransmissions between the source terminal and the source relay terminal reaches a preset maximum number;

A second condition is that a channel quality or a signal received strength between the source relay terminal and a destination node is below a preset threshold; or transmission still fails after the number of transmissions or retransmissions between the source relay terminal and a destination node reaches a preset maximum number, where the destination node is a destination terminal or a destination network node; and A third condition is that the source relay terminal is not suitable for acting as a relay terminal of the source terminal any longer, according to a relay strategy of the source relay terminal.

Preferably if the control node device is the source terminal, then:

If the relay terminal reselection trigger condition includes the first condition, then the first condition is measured by the source terminal, or measured by the source relay terminal, and fed back to the source terminal;

If the relay terminal reselection trigger condition includes the second condition, then the second condition is measured by the source relay terminal, and fed back to the source terminal, or measured by the destination node, and fed back to the source terminal through the source relay terminal; and If the relay terminal reselection trigger condition includes the third condition, then the third condition is determined by the source relay terminal, and fed back to the source terminal.

Preferably if the control node device is the source relay terminal, then:

If the relay terminal reselection trigger condition includes the first condition, then the first condition is measured by the source terminal, and fed back to the source relay terminal, or measured by the source relay terminal;

If the relay terminal reselection trigger condition includes the second condition, then the second condition is measured by the source relay terminal, or measured by the destination node, and fed back to the source relay terminal; and If the relay terminal reselection trigger condition includes the third condition, then the third condition is determined by the source relay terminal.

Preferably the assistance information includes at least one of:

First assistance information which is channel qualities or signal received strengths between the source terminal and the candidate relay terminals;

Second assistance information which is channel qualities or signal received strengths between the candidate relay terminals and a destination node, where the destination node is a destination terminal or a destination network node; and Third assistance information which is relay strategies of the candidate relay terminals.

Preferably if the control node device is the source terminal, then:

If the assistance information includes the first assistance information, then the first assistance information is measured by the source terminal, or measured by the candidate relay terminals, and fed back to the source terminal;

If the assistance information includes the second assistance information, then the second assistance information is measured by the candidate relay terminal or the destination node, and fed back to the source terminal; and If the assistance information includes the third assistance information, then the third assistance information is determined by the candidate relay terminals, and fed back to the source terminal.

Preferably if the control node device is the source relay terminal, then:

If the assistance information includes the first assistance information, then the first assistance information is measured by the source terminal, and fed back to the source relay terminal, or measured by the candidate relay terminals, and fed back to the source relay terminal through the source terminal;

If the assistance information includes the second assistance information, then the second assistance information is measured by the destination node, and fed back to the source relay terminal, or measured by the candidate relay terminals, and fed back to the source relay terminal through the destination node; and If the assistance information includes the third assistance information, then the third assistance information is determined by the candidate relay terminals, and fed back to the source relay terminal through the source terminal or the destination node.

Preferably the control node device further includes a sending module, where:

The sending module is configured, if the control node device is the source terminal, to send a connection release command to the source relay terminal, and to set up a connection with the destination relay terminal, where the connection release command is sent, after the second determining module 803 determines the destination relay terminal for the source terminal, to instruct the source relay terminal to release the connection with the source terminal, and to instruct the source relay terminal to instruct the destination node to release the connection with the source relay terminal, where the destination node is a destination terminal or a destination network node; or The sending module is configured, if the control node device is the source relay terminal, to send a first connection release command to the source terminal, and a second connection release command to a destination node, where the first connection release command and the second connection release command are sent after the second determining module 803 determines the destination relay terminal for the source terminal; the first connection release command instructs the source terminal to release the connection with the source relay terminal, and the second connection release command instructs the destination node to release the connection with the source relay terminal; and the destination node is a destination terminal or a destination network node.

Preferably the control node device further includes an instructing module, where:

The instructing module is configured, if the control node is the source terminal, to send an instruction message to a destination node, where the instruction message is sent, after the deciding module 801 decides to reselect a relay terminal, to instruct the destination node to stop data from being transmitted to the source terminal, and the destination node is a destination terminal or a destination network node; or If the control node is the source relay terminal, to send a first instruction message to the source terminal, and a second instruction message to a destination node, where the first instruction message and the second instruction message are sent after the deciding module 801 decides to reselect a relay terminal; the first instruction message instructs the source terminal to stop data from being transmitted to the destination node, and the second instruction message instructs the destination node to stop data from being transmitted to the source terminal; and the destination node is a destination terminal or a destination network node.

In the control node device according to the embodiments of the invention, the source terminal or the source relay terminal makes the relay terminal reselection decision for the source terminal according to the relay terminal reselection trigger condition, and if the source terminal or the source relay terminal decides to reselect a relay terminal, then the source terminal or the source relay terminal determines the list of candidate relay terminals for the source terminal, and determine the destination relay terminal for the source terminal from the list of candidate relay terminals according to the assistance information, so that if the source relay terminal is not suitable for acting as a relay terminal any longer while the source terminal, the destination node, and the source relay terminal are moving, then the source terminal or the source relay terminal reselects the destination relay terminal for the source terminal.

Based upon the same technical idea, embodiments of the invention further provide terminals, and for details of these terminals, reference can be made to the embodiments above of the method, so a repeated description thereof is omitted here.

Seventh Embodiment

Figure 9:
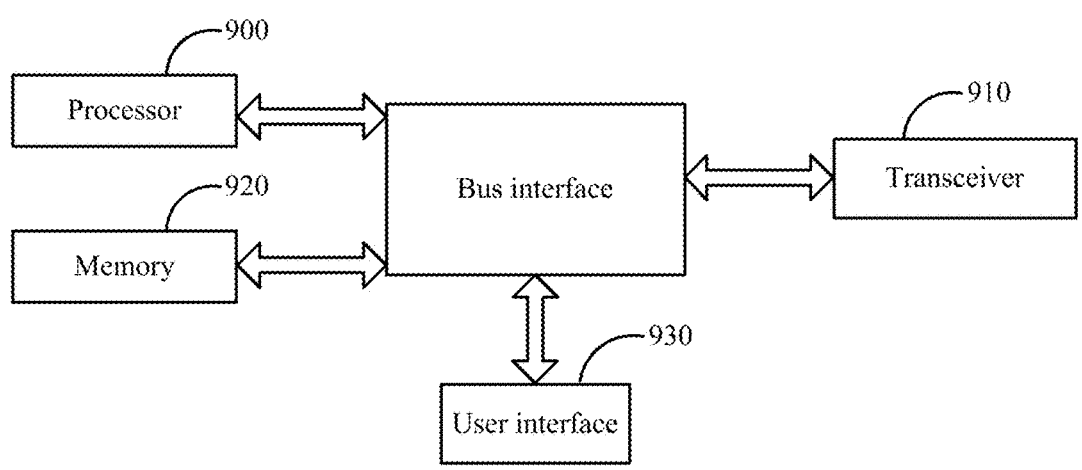
FIG. 9 is a schematic structural diagram of a terminal according to a seventh embodiment of the invention.

FIG. 9 illustrates a terminal according to an embodiment of the invention, where the terminal is a source terminal or a source relay terminal, and the terminal includes:

A processor 900 is configured to read program from a memory, and to perform the processes of:

Making a relay terminal reselection decision for a source terminal according to a relay terminal reselection trigger condition;

If it is decided to reselect a relay terminal, then determining a list of candidate relay terminals for the source terminal; and Determining a destination relay terminal for the source terminal from the list of candidate relay terminals according to obtained assistance information;

A transceiver 910 is configured to be controlled by the processor 900 to receive and transmit data; and The memory 920 is configured to store use for use by the processor 900 in operation.

Here in FIG. 9, the bus architecture can include any number of interconnected buses and bridges to link together various circuits including one or more processors represented by the processor 900, and one or more memories represented by the memory 920. The bus architecture can further link together various other circuits, e.g., peripheral devices, a voltage stabilizer, a power management circuit, etc., and all of these circuits are well known in the art, so a further description thereof is omitted in this context. The bus interface provides an interface. The transceiver 910 can include a number of elements, e.g., a transmitter and a receiver, configured to provide units for communication with various other devices over a transmission medium. For different user equipments, the user interface 930 can also be an interface via which external or internal devices are connected as appropriate, where the connected devices include but will not be limited to a keypad, a display, a speaker, a microphone, a joystick, etc.

The processor 900 is responsible for managing the bus architecture and typical processes, and the memory 920 can store data to be used by the processor 900 in operation.

With the terminal, if the source relay terminal is not suitable for acting as a relay terminal any longer while the source terminal, the destination node, and the source relay terminal are moving, then the source terminal or the source relay terminal reselects a relay terminal for the source terminal.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for reselecting a relay terminal, the method comprising:
   making, by a control node, a relay terminal reselection decision for a source terminal according to a relay terminal reselection trigger condition, wherein the control node is a source terminal or a source relay terminal;
   determining, by the control node, a list of candidate relay terminals for the source terminal, if the control node decides to reselect a relay terminal; and
   determining, by the control node, a destination relay terminal for the source terminal from the list of candidate relay terminals according to obtained assistance information;
   wherein the list of candidate relay terminals comprises terminals adjacent to both the source terminal and a destination terminal, and capable of providing a relay service; and
   wherein if the control node is the source terminal, then the list of candidate relay terminals is determined by the source terminal, or if the control node is the source relay terminal, then the list of candidate relay terminals is determined by the source terminal, and fed back to the source relay terminal; and
   determining, by the source terminal, the list of candidate relay terminals comprises:
   receiving, by the source terminal, a discovery signal broadcasted by an adjacent terminal, and if the discovery signal carries identification information of the destination terminal, and information indicating that the adjacent terminal is capable of providing the source terminal with a relay service, then determining the adjacent terminal as a candidate relay terminal of the source terminal, and putting identification information of the adjacent terminal into the list of candidate relay terminals, wherein the adjacent terminal carries the identification information of the destination terminal in the discovery signal after discovering the destination terminal; or
   broadcasting, by the source terminal, a discovery signal carrying identification information of the source terminal and the destination terminal, and information indicating that the source terminal needs a relay service, and if the source terminal receives discovery signal response information of an adjacent terminal, which carries information indicating that the adjacent terminal is capable of providing the source terminal with a relay service, then determining the adjacent terminal as a candidate relay terminal of the source terminal, and putting identification information of the adjacent terminal into the list of candidate relay terminals, wherein the adjacent terminal returns the discover signal response information to the source terminal upon discovering the terminal corresponding to the identification information of the destination terminal.

2. The method according to claim 1, wherein the list of candidate relay terminals comprises in-coverage terminals adjacent to the source terminal, and capable of providing a relay service.

3. The method according to claim 2, wherein if the control node is the source terminal, then the list of candidate relay terminals is determined by the source terminal, or if the control node is the source relay terminal, then the list of candidate relay terminals is determined by the source terminal, and fed back to the source relay terminal; and
   determining, by the source terminal, the list of candidate relay terminals comprises:
   receiving, by the source terminal, a discovery signal broadcasted by an adjacent terminal, and if the discovery signal carries information indicating that the adjacent terminal is capable of providing the source terminal with a relay service, then determining the adjacent terminal as a candidate relay terminal of the source terminal, and putting identification information of the adjacent terminal into the list of candidate relay terminals; or
   broadcasting, by the source terminal, a discovery signal carrying identification information of the source terminal, and information indicating that the source terminal needs a relay service, and if the source terminal receives discovery signal response information of an adjacent terminal, which carries information indicating that the adjacent terminal is capable of providing the source terminal with a relay service, then determining the adjacent terminal as a candidate relay terminal of the source terminal, and putting identification information of the adjacent terminal into the list of candidate relay terminals.

4. The method according to claim 1, wherein the relay terminal reselection trigger condition comprises at least one of the following conditions:
   a first condition is that a channel quality or a signal received strength between the source terminal and the source relay terminal is below a preset threshold; or transmission still fails after the number of transmissions or retransmissions between the source terminal and the source relay terminal reaches a preset maximum number;
   a second condition is that a channel quality or a signal received strength between the source relay terminal and a destination node is below a preset threshold; or transmission still fails after the number of transmissions or retransmissions between the source relay terminal and a destination node reaches a preset maximum number, wherein the destination node is a destination terminal or a destination network node; and a third condition is that the source relay terminal is not suitable for acting as a relay terminal of the source terminal any longer, according to a relay strategy of the source relay terminal.

5. The method according to claim 4, wherein if the control node is the source terminal, then:
- if the relay terminal reselection trigger condition comprises the first condition, then the first condition is measured by the source terminal, or measured by the source relay terminal and fed back to the source terminal;
- if the relay terminal reselection trigger condition comprises the second condition, then the second condition is measured by the source relay terminal and fed back to the source terminal, or measured by the destination node and fed back to the source terminal through the source relay terminal; and
- if the relay terminal reselection trigger condition comprises the third condition, then the third condition is determined by the source relay terminal, and fed back to the source terminal;

wherein if the control node is the source relay terminal, then:
- if the relay terminal reselection trigger condition comprises the first condition, then the first condition is measured by the source terminal and fed back to the source relay terminal, or measured by the source relay terminal;
- if the relay terminal reselection trigger condition comprises the second condition, then the second condition is measured by the source relay terminal, or measured by the destination node and fed back to the source relay terminal; and
- if the relay terminal reselection trigger condition comprises the third condition, then the third condition is determined by the source relay terminal.

6. The method according to claim 1, wherein the assistance information comprises at least one of:
- first assistance information which is channel qualities or signal received strengths between the source terminal and the candidate relay terminals;
- second assistance information which is channel qualities or signal received strengths between the candidate relay terminals and a destination node, wherein the destination node is a destination terminal or a destination network node; and
- third assistance information which is relay strategies of the candidate relay terminals.

7. The method according to claim 6, wherein if the control node is the source terminal, then:
- if the assistance information comprises the first assistance information, then the first assistance information is measured by the source terminal, or measured by the candidate relay terminals and fed back to the source terminal;
- if the assistance information comprises the second assistance information, then the second assistance information is measured by the candidate relay terminal or the destination node, and fed back to the source terminal; and
- if the assistance information comprises the third assistance information, then the third assistance information is determined by the candidate relay terminals and fed back to the source terminal.

8. The method according to claim 6, wherein if the control node is the source relay terminal, then:
- if the assistance information comprises the first assistance information, then the first assistance information is measured by the source terminal and fed back to the source relay terminal, or measured by the candidate relay terminals and fed back to the source relay terminal through the source terminal;
- if the assistance information comprises the second assistance information, then the second assistance information is measured by the destination node and fed back to the source relay terminal, or measured by the candidate relay terminals and fed back to the source relay terminal through the destination node; and
- if the assistance information comprises the third assistance information, then the third assistance information is determined by the candidate relay terminals and fed back to the source relay terminal through the source terminal or the destination node;

wherein if the control node is the source terminal, after the control node determines the destination relay terminal for the source terminal from the list of candidate relay terminals according to the assistance information, the method further comprises:
- sending, by the source terminal, a connection release command to the source relay terminal, and setting up a connection with the destination relay terminal, wherein the connection release command instructs the source relay terminal to release the connection with the source terminal, and instructs the source relay terminal to instruct the destination node to release the connection with the source relay terminal, wherein the destination node is a destination terminal or a destination network node; or if the control node is the source relay terminal, after the control node determines the destination relay terminal for the source terminal from the list of candidate relay terminals according to the assistance information, the method further comprises:
- sending, by the source relay terminal, a first connection release command to the source terminal, and a second connection release command to a destination node, wherein the first connection release command instructs the source terminal to release the connection with the source relay terminal, and the second connection release command instructs the destination node to release the connection with the source relay terminal; and the destination node is a destination terminal or a destination network node.

9. The method according to claim 8, wherein the connection release command carries information about the destination relay terminal, and after the destination node receives the instruction sent by the source relay terminal, the method further comprises: setting up a connection between the destination node and the destination relay terminal; or
both the first connection release command and the second connection release command carry information about the destination relay terminal, and after the source terminal and the destination node receive the first connection release command or the second connection release command, the method further comprises: setting up a connection between the destination node and the destination relay terminal.

10. The method according to claim 1, wherein if the control node is the source terminal, then after the control node decides to reselect a relay terminal, the method further comprises:
sending, by the source terminal, an instruction message to a destination node through the source relay terminal to instruct the destination node to stop data from being transmitted to the source terminal, wherein the destination node is a destination terminal or a destination network node; or if the control node is the source relay terminal, then after the control node decides to reselect a relay terminal, the method further comprises:
sending, by the source relay terminal, a first instruction message to the source terminal, and a second instruction message to a destination node, wherein the first instruction message instructs the source terminal to stop data from being transmitted to the destination node, and the second instruction message instructs the destination node to stop data from being transmitted to the source terminal; and the destination node is a destination terminal or a destination network node.

11. A terminal, comprising:
a processor configured to read program from a memory, and to perform the processes of:
making a relay terminal reselection decision for a source terminal according to a relay terminal reselection trigger condition;
if it is decided to reselect a relay terminal, then determining a list of candidate relay terminals for the source terminal; and
determining a destination relay terminal for the source terminal from the list of candidate relay terminals according to obtained assistance information;
a transceiver configured to be controlled by the processor to receive and transmit data; and
the memory configured to store program for use by the processor in operation;
wherein the list of candidate relay terminals comprises terminals adjacent to both the source terminal and a destination terminal, and capable of providing a relay service; and
wherein:
if the terminal is the source terminal, then the list of candidate relay terminals is determined by the source terminal;
and the processor configured to perform the processes of determining the list of candidate relay terminals comprises:
receiving a discovery signal broadcasted by an adjacent terminal, and if the discovery signal carries identification information of the destination terminal, and information indicating that the adjacent terminal is capable of providing the source terminal with a relay service, then determining the adjacent terminal as a candidate relay terminal of the source terminal, and putting identification information of the adjacent terminal into the list of candidate relay terminals, wherein the adjacent terminal carries the identification information of the destination terminal in the discovery signal after discovering the destination terminal; or
broadcasting a discovery signal carrying identification information of the source terminal and the destination terminal, and information indicating that the source terminal needs a relay service, and if the source terminal receives discovery signal response information of an adjacent terminal, which carries information indicating that the adjacent terminal is capable of providing the source terminal with a relay service, then determining the adjacent terminal as a candidate relay terminal of the source terminal, and putting identification information of the adjacent terminal into the list of candidate relay terminals, wherein the adjacent terminal returns the discover signal response information to the source terminal upon discovering the terminal corresponding to the identification information of the destination terminal;

or if the terminal is a source relay terminal, then the processor is configured to control the transceiver to receive the list of candidate relay terminals from a source terminal.

12. The terminal according to claim 11, wherein the list of candidate relay terminals comprises in-coverage terminals adjacent to the source terminal, and capable of providing a relay service;
wherein if the terminal is the source terminal, then the list of candidate relay terminals is determined by the source terminal;
and the processor configured to perform the process of determining the list of candidate relay terminals comprises:
receiving a discovery signal broadcasted by an adjacent terminal, and if the discovery signal carries information indicating that the adjacent terminal is capable of providing the source terminal with a relay service, then determining the adjacent terminal as a candidate relay terminal of the source terminal, and putting identification information of the adjacent terminal into the list of candidate relay terminals; or
broadcasting a discovery signal carrying identification information of the source terminal, and information indicating that the source terminal needs a relay service, and if the source terminal receives discovery signal response information of an adjacent terminal, which carries information indicating that the adjacent terminal is capable of providing the source terminal with a relay service, then determining the adjacent terminal as a candidate relay terminal of the source terminal, and putting identification information of the adjacent terminal into the list of candidate relay terminals;

or if the terminal is the source relay terminal, then the processor is configured to control the transceiver to receive the list of candidate relay terminals from a source terminal.

13. The terminal according to claim 11, wherein the relay terminal reselection trigger condition comprises at least one of the following conditions:
a first condition is that a channel quality or a signal received strength between the source terminal and the source relay terminal is below a preset threshold; or transmission still fails after the number of transmissions or retransmissions between the source terminal and the source relay terminal reaches a preset maximum number;
a second condition is that a channel quality or a signal received strength between the source relay terminal and a destination node is below a preset threshold; or transmission still fails after the number of transmissions or retransmissions between the source relay terminal and a destination node reaches a preset maximum number, wherein the destination node is a destination terminal or a destination network node; and a third condition is that the source relay terminal is not suitable for acting as a relay terminal of the source terminal any longer, according to a relay strategy of the source relay terminal;

wherein if the terminal is the source terminal, then:

if the relay terminal reselection trigger condition comprises the first condition, then the processor is configured to perform the process of measuring the first condition, or to control the transceiver to receive measurement result of the first condition from the source relay terminal;

if the relay terminal reselection trigger condition comprises the second condition, then the processor is configured to control the transceiver to receive measurement result of the second condition from a source relay terminal, or to control the transceiver to receive measurement result of the second condition from the destination node through a source relay terminal; and if the relay terminal reselection trigger condition comprises the third condition, then the processor is configured to control the transceiver to receive measurement result of the third condition from a source relay terminal;

wherein if the terminal is the source relay terminal, then:

if the relay terminal reselection trigger condition comprises the first condition, the processor is configured to perform the process of measuring the first condition, or to control the transceiver to receive measurement result of the first condition from a source terminal;

if the relay terminal reselection trigger condition comprises the second condition, then the processor is configured to perform the process of measuring the second condition, or to control the transceiver to receive measurement result of the second condition from a destination node; and if the relay terminal reselection trigger condition comprises the third condition, then the processor is configured to perform the process of determining the third condition.

14. The terminal according to claim 11, wherein the assistance information comprises at least one of:

first assistance information which is channel qualities or signal received strengths between the source terminal and the candidate relay terminals;

second assistance information which is channel qualities or signal received strengths between the candidate relay terminals and a destination node, wherein the destination node is a destination terminal or a destination network node; and third assistance information which is relay strategies of the candidate relay terminals;

if the terminal is the source terminal, then:

if the assistance information comprises the first assistance information, then the processor is configured to perform the process of measuring the first assistance information, or to control the transceiver to receive measurement result of the first assistance information from the candidate relay terminal;

if the assistance information comprises the second assistance information, then the processor is configured to control the transceiver to receive measurement result of the second assistance information from the candidate relay terminal or the destination node; and if the assistance information comprises the third assistance information, then the processor is configured to control the transceiver to receive measurement result of the third assistance information from the candidate relay terminals;

if the terminal is the source relay terminal, then:

if the assistance information comprises the first assistance information, then the processor is configured to control the transceiver to receive measurement result of the first assistance information from the source terminal, or to control the transceiver to receive measurement result of the first assistance information from the candidate relay terminals through the source terminal;

if the assistance information comprises the second assistance information, then the processor is configured to control the transceiver to receive measurement result of the second assistance information from the destination node, or the processor is configured to control the transceiver to receive measurement result of the second assistance information from the candidate relay terminal through the destination node; and if the assistance information comprises the third assistance information, then the processor is configured to control the transceiver to receive measurement result of the third assistance information from the candidate relay terminals through the source terminal or the destination node;

wherein if the terminal is the source terminal, after the terminal determines the destination relay terminal for the source terminal from the list of candidate relay terminals according to the assistance information, the processor is further configured to perform the process of:

sending a connection release command to the source relay terminal, and setting up a connection with the destination relay terminal, wherein the connection release command instructs the source relay terminal to release the connection with the source terminal, and instructs the source relay terminal to instruct the destination node to release the connection with the source relay terminal, wherein the destination node is a destination terminal or a destination network node; or if the terminal is the source relay terminal, after the terminal determines the destination relay terminal for the source terminal from the list of candidate relay terminals according to the assistance information, the processor is further configured to perform the process of:

sending a first connection release command to the source terminal, and a second connection release command to a destination node, wherein the first connection release command instructs the source terminal to release the connection with the source relay terminal, and the second connection release command instructs the destination node to release the connection with the source relay terminal; and the destination node is a destination terminal or a destination network node.

15. The terminal according to claim 14, wherein the connection release command carries information about the destination relay terminal, and after the destination node receives the instruction sent by the source relay terminal, the processor is further configured to perform the process of:

setting up a connection between the destination node and the destination relay terminal; or both the first connection release command and the second connection release command carry information about the destination relay terminal, and after the source terminal and the destination node receive the first connection release command or the second connection release command, the processor is further configured to perform the process of: setting up a connection between the destination node and the destination relay terminal.

16. The terminal according to claim 11, wherein if the terminal is the source terminal, then after the terminal decides to reselect a relay terminal, the processor is further configured to perform the process of:
   sending an instruction message to a destination node through the source relay terminal to instruct the destination node to stop data from being transmitted to the source terminal, wherein the destination node is a destination terminal or a destination network node; or
   if the terminal is the source relay terminal, then after the terminal decides to reselect a relay terminal, the processor is further configured to perform the process of:
   sending a first instruction message to the source terminal, and a second instruction message to a destination node, wherein the first instruction message instructs the source terminal to stop data from being transmitted to the destination node, and the second instruction message instructs the destination node to stop data from being transmitted to the source terminal; and the destination node is a destination terminal or a destination network node.

17. A control node, comprising:
   a processor configured to read program from a memory, and to perform the method for reselecting a relay terminal according to claim 1;
   a transceiver configured to be controlled by the processor to receive and transmit data; and
   the memory configured to store program for use by the processor in operation.

\* \* \* \* \*